US011863831B2

(12) United States Patent
Barone et al.

(10) Patent No.: US 11,863,831 B2
(45) Date of Patent: *Jan. 2, 2024

(54) REMOTE CONTROL DEVICES TO INTERFACE WITH AUDIENCE MEASUREMENT METERS

(71) Applicant: THE NIELSEN COMPANY (US), LLC, New York, NY (US)

(72) Inventors: Eric Barone, Tampa, FL (US); Joseph Wyatt Brewer, Tarpon Springs, FL (US); Matjaz Finc, Izola (SI); Robert Byrne, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,598

(22) Filed: Jun. 20, 2022

(65) Prior Publication Data
US 2022/0368990 A1 Nov. 17, 2022

Related U.S. Application Data

(63) Continuation of application No. 16/706,335, filed on Dec. 6, 2019, now Pat. No. 11,368,759.
(Continued)

(51) Int. Cl.
*H04N 21/475* (2011.01)
*H04N 21/258* (2011.01)
*H04N 21/422* (2011.01)

(52) U.S. Cl.
CPC ..... *H04N 21/475* (2013.01); *H04N 21/25883* (2013.01); *H04N 21/42204* (2013.01)

(58) Field of Classification Search
CPC ........... H04N 21/475; H04N 21/25883; H04N 21/42204; H04N 21/42208; H04N 21/4221; H04N 21/44222
See application file for complete search history.

(56) References Cited

U.S. PATENT DOCUMENTS 4,912,463 A   3/1990 Li
2003/0103088 A1   6/2003 Dresti et al.
(Continued)

FOREIGN PATENT DOCUMENTS

KR   101369475   3/2014

OTHER PUBLICATIONS

International Searching Authority, "International Search Report," issued in connection with International Patent Application No. PCT/US2020/012571, dated Apr. 28, 2020, 5 pages.
International Searching Authority, "Written Opinion," issued in connection with International Patent Application No. PCT/US2020/012571, dated Apr. 28, 2020, 6 pages.
International Bureau, "Invitation to Correct Defects in the International Application," issued in connection with International Patent Application No. PCT/US2020/012571, dated Jan. 28, 2020, 3 pages.
(Continued)

*Primary Examiner* — Nathan J Flynn
*Assistant Examiner* — Christine A Kurien

(57) ABSTRACT

Remote control devices to interface with audience measurement meters are disclosed. An example remote control device to interface with an audience measurement meter includes an audience management controller to, responsive to a gender value input via a user interface of the remote control device, store the gender value, responsive to an age value input via the user interface of the remote control device, store the age value, generate a message including the gender value and age value, and a transmitter to transmit the message to the audience measurement meter, the message including a sequence of infrared codes.

20 Claims, 13 Drawing Sheets

Related U.S. Application Data

(60) Provisional application No. 62/791,470, filed on Jan. 11, 2019.

(56) References Cited

U.S. PATENT DOCUMENTS

| | | | |
|---|---|---|---|
| 2009/0138907 A1* | 5/2009 | Wiser | H04N 21/4532 |
| | | | 725/151 |
| 2011/0115985 A1* | 5/2011 | Beals | H04N 21/42204 |
| | | | 348/734 |
| 2011/0209066 A1 | 8/2011 | Sakata et al. | |
| 2012/0314140 A1 | 12/2012 | Wiser et al. | |
| 2013/0179914 A1 | 7/2013 | Falcon | |
| 2013/0318546 A1 | 11/2013 | Kothuri et al. | |
| 2014/0064735 A1* | 3/2014 | Thompson | H04W 4/80 |
| | | | 340/12.23 |
| 2015/0156521 A1 | 6/2015 | Blanchard et al. | |
| 2015/0237395 A1 | 8/2015 | Barney et al. | |
| 2017/0118519 A1* | 4/2017 | Oztaskent | H04N 21/8133 |
| 2017/0127133 A1* | 5/2017 | Sullivan | H04N 21/252 |
| 2017/0374415 A1 | 12/2017 | Cooper et al. | |
| 2020/0228869 A1 | 7/2020 | Barone et al. | |

OTHER PUBLICATIONS

International Bureau, "International Preliminary Report on Patentability", issued in connection with International Patent Application No. PCT/US2020/012571 dated Jul. 22, 2021, 8 pages.

IP Australia, "Examination Report No. 1", issued in connection with Australian Patent Application No. 2020207037 dated Jun. 30, 2022, 3 pages.

European Patent Office, "Extended European Search Report", issued in connection with European Patent Application No. 20737925.6 dated Aug. 31, 2022, 9 pages.

United States Patent and Trademark Office, "Non-Final Office Action", issued in connection with U.S. Appl. No. 16/706,335 dated Apr. 30, 2021, 8 pages.

United States Patent and Trademark Office, "Final Office Action", issued in connection with U.S. Appl. No. 16/706,335 dated Nov. 10, 2021, 10 pages.

United States Patent and Trademark Office, "Notice of Allowance and Fee(s) Due", issued in connection with U.S. Appl. No. 16/706,335 dated Feb. 18, 2022, 7 pages.

IP Australia, "Examination report No. 2 for standard patent application," issued in connection with Australian Patent Application No. 2020207037 dated Nov. 21, 2022, 3 pages.

* cited by examiner

REMOTE CONTROL DEVICES TO INTERFACE WITH AUDIENCE MEASUREMENT METERS

RELATED APPLICATION

This patent arises from a continuation of U.S. patent application Ser. No. 16/706,335, which was file on Dec. 6, 2019, entitled "REMOTE CONTROL DEVICES TO INTERFACE WITH AUDIENCE MEASUREMENT METERS, which arise from a continuation of U.S. Provisional Patent Application Ser. No. 62/791,470, which was filed on Jan. 11, 2019. U.S. patent application Ser. No. 16/706,335 and U.S. Provisional Patent Application Ser. No. 62/791,470 are hereby incorporated herein in their entirety. Priority to U.S. patent application Ser. No. 16/706,335 and U.S. Provisional Patent Application Ser. No. 62/791,470 are hereby claimed.

FIELD OF THE DISCLOSURE

This disclosure relates generally to audience measurement meters and, more particularly, to remote control devices to interface with audience measurement meters.

BACKGROUND

Audience measurement entities, such as The Nielsen Company (US), LLC, employ audience measurement meters to monitor media presented by one or more media devices located at monitored sites. Some such audience measurement meters also include people metering functionality to obtain information characterizing the composition(s) of the audience(s) in the vicinity of the media device(s) being monitored. The people metering functionality implemented by such audience measurement meters generally falls into two categories, namely, active people metering or passive people metering. Active people metering includes functionality to obtain audience information by actively prompting an audience member to press an input key or otherwise enter information via the people meter. Passive people metering includes functionality to obtain audience information by passively monitoring the audience, such as by using facial recognition techniques to identify the individual audience members included in the audience.

BRIEF DESCRIPTION OF THE DRAWINGS

The figures are not to scale. In general, the same reference numbers will be used throughout the drawing(s) and accompanying written description to refer to the same or like parts, elements, etc.

DETAILED DESCRIPTION

Figure 1:
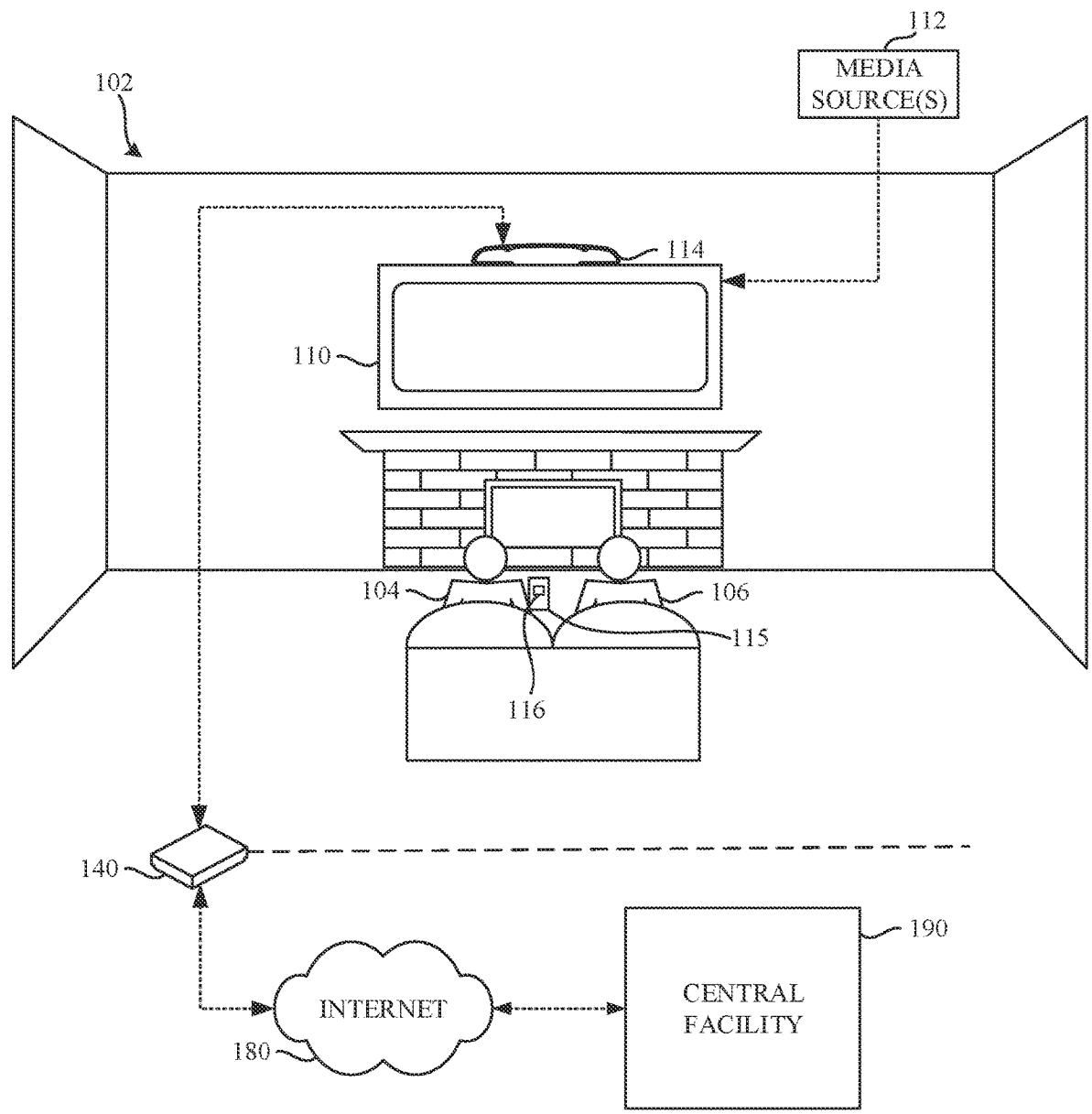
FIG. 1 is an illustration of an example audience measurement system including an example audience measurement meter and an example remote control device constructed in accordance with the teachings of this disclosure.

In some example media monitoring applications, a remote control device is utilized to identify presence of a panelist (e.g., a household member) to an audience measurement meter whenever the panelist is an audience member associated with a particular monitored media device (e.g., a monitored television set at a household site).

An example approach to register panelists via active people monitoring includes utilizing a remote control device configured with user select buttons. In some such examples, the remote control device may have a button corresponding to a panelist in a household. For example, panelists are instructed to press a button (e.g., a respective button assigned to a corresponding panelist) when they are in a viewing audience of a monitored media presentation. Some prior approaches may not properly account for visitor members and/or other guest members of the household that may be in a viewing audience of a monitored media presentation. For example, some prior approaches may not properly enable the guest member to identify and/or otherwise log in to an audience measurement meter. Further, some prior approaches may not allow current panelists to update and/or otherwise add their demographic information.

Remote control devices to interface with audience measurement meters are disclosed herein. Example remote control devices disclosed herein include (1) a new visitor data entry section of the remote control and/or (2) new macro infrared (IR) messaging to communicate with the audience measurement meter.

Example remote control devices disclosed herein are used to log a panelist household member with the audience measurement meter whenever he or she becomes an audience member associated with a particular monitored media device (e.g., a monitored television set at a household site). In some examples, whenever a guest member of the household joins the audience of a monitored media device, the guest uses the disclosed remote control device to log herself or himself with the audience measurement meter by providing the guest member's gender and age. Further, the remote control device can also be used to confirm whether the audience logged in to or otherwise currently registered with the meter is still the current and complete audience after a duration of time has passed. Disclosed example remote control devices improve over existing remote control devices used with audience measurement meter by enabling visitor gender and age information to be entered and transmitted to the audience measurement meter. As such, examples disclosed herein may allow any viewer, panelist, audience member, guest audience member, etc., to enter gender and age information to be transmitted to the audience measurement meter. For example, the remote control device may be set to registration mode and, as such, any viewer (e.g., panelist, audience member, guest member, etc.) may enter their demographic information (e.g., gender and/or age information).

Disclosed example remote control devices also employ improved IR transmission protocols relative to existing IR transmission protocols that are limited to a 6 bit payload, which may not be large enough to store and transmit gender and age information simultaneously.

As disclosed in further detail below, example remote control devices disclosed herein provide a number of ergonomic changes over existing remote control devices for audience measurement meters, such as: condensing the numeric keypad footprint, exhibiting a slimmer body, providing silicone/rubber buttons with colors corresponding to the colors shown on the meter, providing individual backlights for the different button, providing printed instructions for entering visitor data, etc. Functional changes to disclosed example remote control devices relative to existing remote control devices include addition of a viewer entry section of the remote. In some disclosed examples, a backlit liquid crystal display (LCD) screen is embedded within the viewer entry section to display the numbers typed in by the user to represent the visitor's age. In some disclosed examples, an additional pair of Enter/Cancel buttons is co-located within the viewer entry section for ease of use. In some disclosed examples, communication over infrared (IR) is done in a single burst of RC-5 codes in a unique timing format referred to herein as macro messaging.

Turning to the figures, FIG. 1 is an illustration of an example audience measurement system including an example audience measurement meter 114 and an example remote control device 115 constructed in accordance with the teachings of this disclosure. In FIG. 1, the example remote control device 115 includes an example audience management controller 116. In the illustrated example of FIG. 1, an example media presentation environment 102 includes example panelists 104, 106, an example media device 110 (also referred to as a media presentation device) that receives media from an example media source 112, and the example audience measurement meter 114, also referred to herein as the example meter 114. The example meter 114 identifies the media presented by the example media device 110 and reports media monitoring information to an example central facility 190 of an example audience measurement entity via an example gateway 140 and an example network 180. In some examples, the meter 114 is referred to as a site meter, a device meter, an audience measurement device, etc. As disclosed in further detail below, the meter 114 is able to verify interconnection between the media device 110 and the meter 114 with an example touch sensing integrated circuit in accordance with the teachings of this disclosure. In examples disclosed herein, the remote control device 115 may be an example first means for controlling.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user display presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia device capable of presenting media audibly and/or visually. In some examples, the media device 110 (e.g., a television) may communicate audio to another media device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media device 110 (e.g., near a television set). In some examples, more complex installation activities may be performed such as, for example, affixing the meter 114 to the media device 110, electronically connecting the meter 114 to the media device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media device 110 and/or other media device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 114 of the illustrated example of FIG. 1 monitors for watermarks (sometimes referred to as codes) included in the presented media and/or generates signatures (sometimes referred to as fingerprints) representative of the presented media Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Depending on the type(s) of metering the meter 114 is to perform, the meter 114 can be physically coupled to the media device 110 or may be configured to capture audio emitted externally by the media device 110 (e.g., free field audio) such that direct physical coupling to the media device 110 is not required. For example, the meter 114 of the illustrated example may employ non-invasive monitoring not involving any physical connection to the media device 110 (e.g., via Bluetooth® connection, WIFI® connection, acoustic sensing via one or more microphone(s) and/or other acoustic sensor(s), etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 114 of the illustrated example senses audio (e.g., acoustic signals or ambient audio) output (e.g., emitted) by the media device 110. For example, the meter 114 processes the signals obtained from the media device 110 to detect media and/or source identifying signals (e.g., audio watermarks, audio signatures) embedded in and/or generated from portion(s) (e.g., audio portions) of the media presented by the media device 110. To, for example, sense ambient audio output by the media device 110, the meter 114 of the illustrated example includes an example acoustic sensor (e.g., a microphone). In some examples, the meter 114 may process audio signals obtained from the media device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106) from the remote control device 115. In examples disclosed herein, the audience management controller 116 receives an input from a user (e.g., one of the panelists 104, 106, a guest audience member, etc.) on the remote control device 115. Accordingly, the audience management controller 116 processes the input to identify which of the panelists 104, 106 and/or any guest audience members are present in the audience.

In examples disclosed herein, the meter 114 may collect audience identification data from the remote control device 115 by periodically and/or a-periodically prompting audience members (e.g., any of the panelists 104, 106 and/or any guest audience members) in the media presentation environment 102 to identify themselves as present in the audience. In some examples, the meter 114 responds to predetermined events (e.g., when the media device 110 is turned on, a channel is changed, an infrared control signal is detected, etc.) by prompting the audience member(s) to self-identify via the remote control device 115. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In examples disclosed herein, the meter 114 is configured to obtain an example macro message from the remote control device 115. An example macro message includes a number of data entries preceded by a macro identifier (ID). Such a macro ID is analyzed by the meter 114 to identify the number of data entries included in the macro message. For example, the meter 114 may decode the macro message to identify a number of commands to be expected. Example macro messages may also include a number of pauses between data entries and, based on identifying the number of pauses, the meter 114 can identify whether the received number of data entries matches the number of data entries associated with the macro ID. In some examples disclosed herein, a macro ID may be generated responsive to a gender input. Additionally or alternatively, in some examples disclosed herein, a macro ID may be generated responsive to a reprogram request to update and/or otherwise change an address of the meter 114. As used herein, an address of the meter 114 corresponds to an identifying address used to communicate with the meter 114. Table 1 below illustrates example values associated with a macro ID generated responsive to a gender input.

TABLE 1

| Macro ID | RC-5 Command |
|---|---|
| Gender - Male | 0x3A |
| Gender - Female | 0x3B |

In Table 1, a macro message corresponding to visitor information of a male may be initiated with the macro ID 0x3A. Likewise, a macro message corresponding to visitor information of a female may be initiated with the macro ID 0x3B. In other examples disclosed herein, any suitable RC-5 command may be utilized as a macro ID.

In examples disclosed herein, the meter 114 may provide feedback (e.g., play an audio signal, illuminate a light) responsive to receiving a macro message. In some examples, in the event the meter 114 receives an incomplete macro message, or an unidentified macro message, the meter 114 may provide feedback (e.g., play an audio signal, illuminate a light) indicating such a macro message is incomplete and/or unidentified. In examples disclosed herein, the meter 114 may identify such a macro message as incomplete and/or unidentified in response to determining the macro message does not include the specified number of data entries associated with the macro ID. In some examples disclosed herein, the meter 114 may ignore or reject the macro message if the macro message is incomplete or unidentified.

In examples disclosed herein, responsive to obtaining a macro message indicating to reprogram a meter address (e.g., an address identifying the meter 114), the meter 114 may determine whether the requested address included in the macro message is available for reprogramming. Responsive to determining the macro message includes an address available for reprogramming, the meter 114 may reconfigure the currently stored address and provide feedback (e.g., play an audio signal, illuminate a light).

The generation and transmission of example macro messages by the remote control device is discussed further detail below in connection with the audience management controller 116 of FIG. 8.

In examples disclosed herein, the audience identification data may include an age and gender entered on the remote control device 115 by a guest audience member. For example, a guest audience member may not have an assigned demographic button and, as such, enters the guest's age and/or gender via the remote control device. In such examples, the audience management controller 116 identifies such audience identification data associated with the guest audience member to the meter 114.

In some examples, the meter 114 may be configured to receive panelist information via an input device such as, for example, the remote control device 115. In some such examples, the meter 114 prompts the audience members to indicate their presence by pressing an appropriate input key on the remote control device 115. The meter 114 of the illustrated example may also determine times at which to prompt the audience members to enter information to the meter 114. In some examples, the remote control device 115 can also be used to register guest members with the meter 114 (e.g., by allowing a guest member to register his or her gender and/or age with the meter 114). In some examples, the meter 114 of FIG. 1 supports audio watermarking for people monitoring, which enables the meter 114 to detect the presence of a panelist-identifying metering device in the vicinity (e.g., in the media presentation environment 102) of the media device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190. In examples disclosed herein, the meter 114 may be an example means for metering.

In the example illustrated in FIG. 1, the audience management controller 116 is configured to process input from an audience member on the remote control device 115. In examples disclosed herein, the audience management controller 116 is configured to transmit a macro message by sending a series of IR codes, which correspond to the audience member's input data, to the meter 114. In this manner, the IR codes sent from the remote control device 115 identify the audience member(s) currently in the viewing audience. Further description and operation of the audience management controller 116 is provided below in connection with FIGS. 8, 9, and/or 10. In examples disclosed herein, the audience management controller 116 may be an example means for managing.

The example gateway 140 of the illustrated example of FIG. 1 can be implemented by a router that enables the meter 114 and/or other devices in the media presentation environment (e.g., the media device 110) to communicate with the network 180 (e.g., the Internet.)

In some examples, the example gateway 140 facilitates delivery of media from the media source(s) 112 to the media device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media device 110. However, the meter 114 may be affixed to the media device in any other orientation, such as, for example, on a side of the media device 110, on the bottom of the media device 110, and/or may not be affixed to the media device 110. For example, the meter 114 may be placed in a location near the media device 110.

Figure 2:
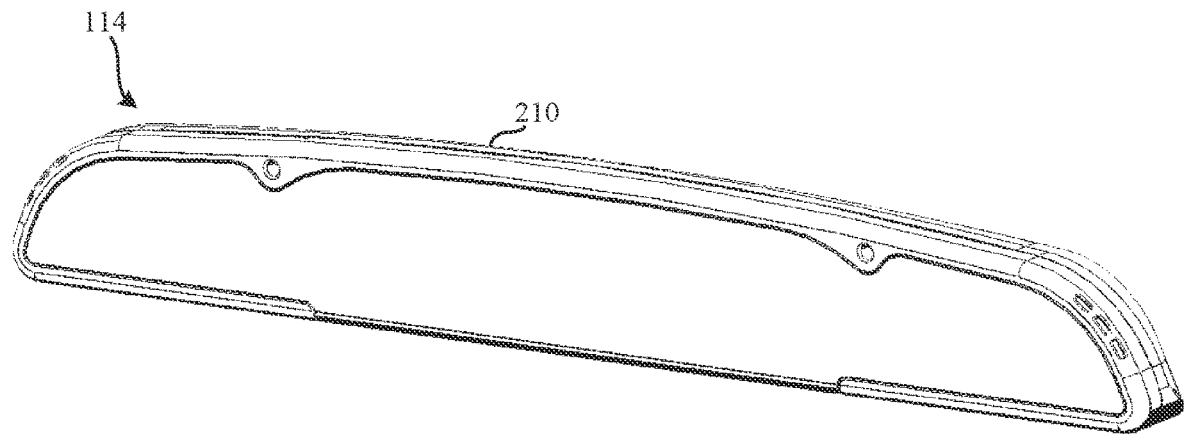
FIG. 2 is an example front view of the example meter of FIG. 1.

FIG. 2 is an example front view of the example meter 114 of FIG. 1. In the illustrated example of FIG. 2, the example meter 114 includes an example housing 210. In examples disclosed herein, the housing 210 is to be affixed to the media device 110. For example, the housing may be affixed to a top of the media device 110, may be affixed to a bottom of the media device 110, may be affixed to a side of the media device 110, etc. In some examples, the housing 210 of the meter 114 is not affixed to the media device 110. For example, the housing 210 may be placed in any other location within the media presentation environment 102 such that audio may be received by the meter 114.

Figure 3:
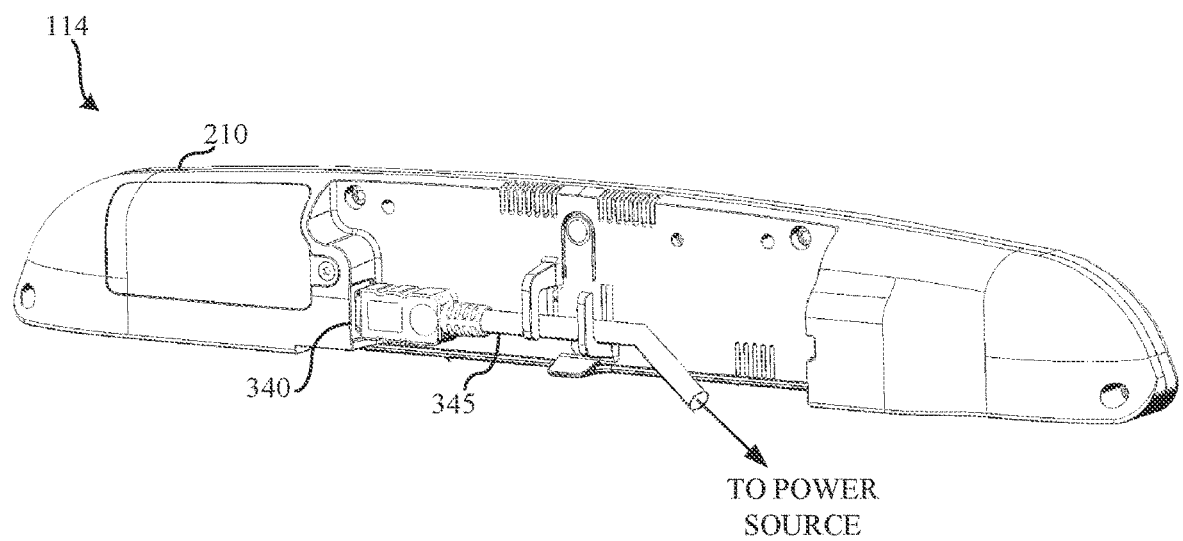
FIG. 3 is an example rear view of the example meter of FIG. 1.

FIG. 3 is an example rear view of the example meter 114 of FIG. 1. In the illustrated example of FIG. 3, the example housing 210 includes an example USB port 340. In the illustrated example of FIG. 3, the USB port 340 enables a USB cable 345 to connect the example meter 114 to an external power source (e.g., a power source provided by the media device 110). However, any other type(s) and/or number(s) of ports, cables, power source(s), etc. may additionally or alternatively be used.

Figure 4:
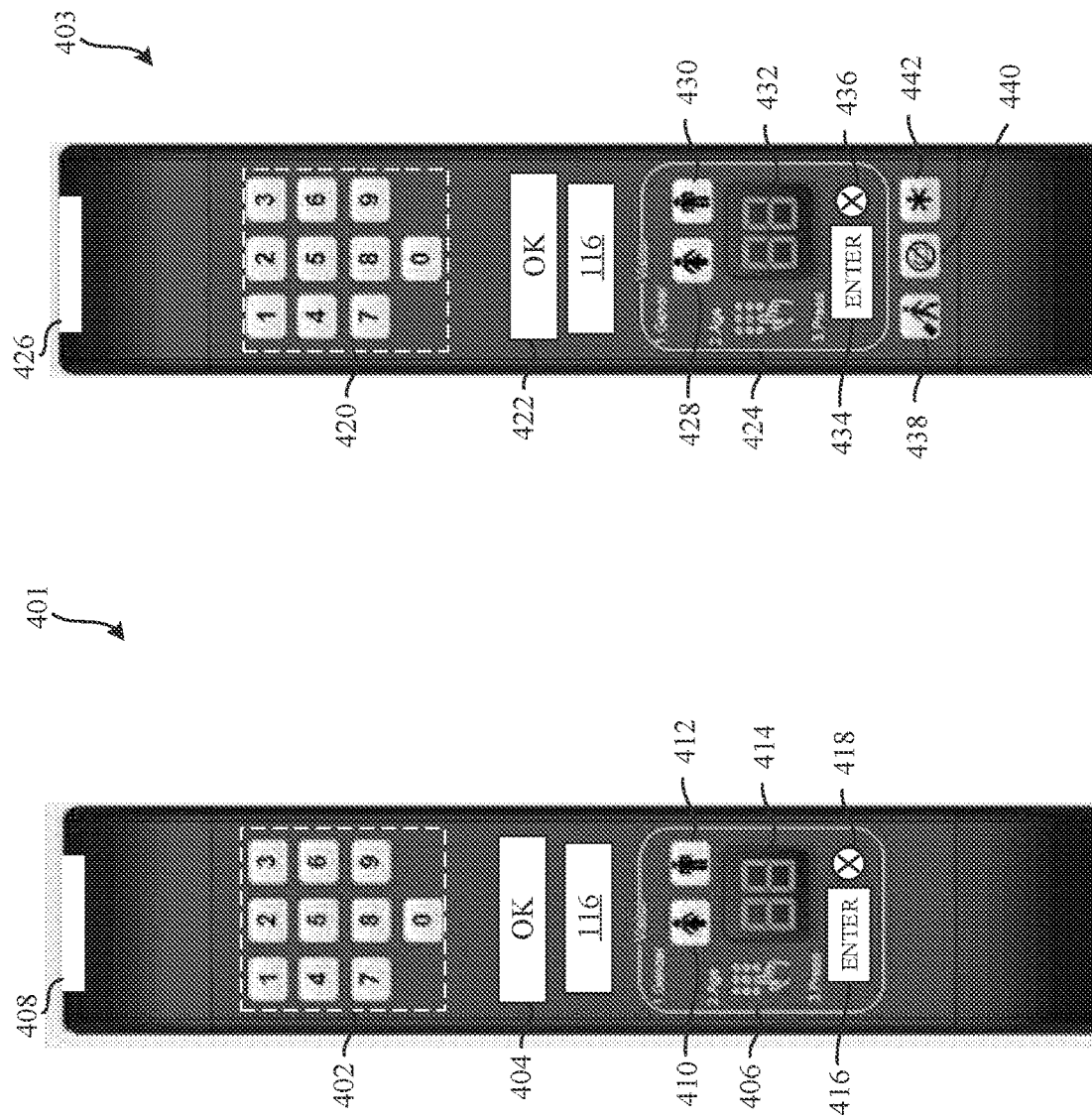
FIGS. 4A-4B illustrate first and second example versions of the remote control device of FIG. 1.

FIGS. 4A-4B illustrate first and second example versions of the remote control device 115 of FIG. 1. FIG. 4A includes a first example remote control device 401. FIG. 4B includes a second example remote control device 403. In examples disclosed herein, any of the remote control device 401 and/or the remote control device 403 illustrated in FIGS. 4A and/or 4B, respectively, may be utilized to implement the remote control device 115 of FIG. 1.

In FIG. 4A, the remote control device 401 includes the audience management controller 116 (FIG. 1), an example numeric keypad 402, an example confirmation button 404, an example viewer entry section 406, and an example transmitter 408.

The example numeric keypad 402 of FIG. 4A includes numeric buttons (e.g., buttons 0-9). In examples disclosed herein, the numeric keypad 402 may be implemented using any suitable numeric keypad interface such as, for example, a touch screen, tactile buttons, mechanical buttons, etc., to be utilized by an audience member (e.g., any of the panelists 104, 106 of FIG. 1 and/or any guest audience member) to enter numerical value. In examples disclosed herein, an audience member (e.g., any of the panelists 104, 106 of FIG. 1 and/or any guest audience member) may utilize the numeric keypad 402 to enter a desired channel (e.g., a numerical indication of a television channel to view), an age value (e.g., an age value to identify proper audience member age demographics), etc. In examples disclosed herein, the audience management controller 116 processes input to the numeric keypad 402 to transmit data via an IR signal from the transmitter 408.

In the example illustrated in FIG. 4A, the confirmation button 404 is implemented as tactile button on the remote control device 401. In other examples disclosed herein, the confirmation button 404 may be implemented using any suitable interface such as, for example, a touch screen, a mechanical button, etc. The confirmation button 404 of FIG. 4A is illustrated having the text "OK." In other examples disclosed herein, the confirmation button 404 may include any suitable text, character, symbol, etc., suitable to indicate a confirmation selection. For example, the confirmation button 404 may be implemented having a checkmark. In examples disclosed herein, the audience management controller 116 processes input to the confirmation button 404 to alter operation of the remote control device 401 and/or transmit data in a macro message via an IR signal from the transmitter 408.

In the example illustrated in FIG. 4A, the viewer entry section 406 includes example gender input buttons 410, 412, an example display 414, an example selection button 416, and an example cancel button 418. The example gender input buttons 410, 412 correspond to female and male, respectively. In examples disclosed herein, the gender input buttons 410, 412 are tactile buttons. In other examples disclosed herein, the gender input buttons 410, 412 may be implemented using any suitable input interface such as, for example, a touch screen, mechanical buttons, etc.

The example display 414 is implemented using a backlit LCD screen. The display 414 is configured to illuminate numerical values corresponding to an age input. For example, when a guest audience member enters an age value, the display 414 is configured to illuminate such corresponding numerical values. In other examples disclosed herein, the display 414 may be implemented using any suitable method and/or device for displaying and/or otherwise illuminating input values such as, for example, a light-emitting diode (LED) display, a plasma display, a projector, an analog display and/or otherwise monitor, etc.

The following table, Table 2, illustrates example behavior illumination of the gender input buttons 410, 412, and the display 414.

TABLE 2

| Time Since Last Button Push (seconds) | Gender Button Backlight | Display Digits | Display Backlight | Notes |
|---|---|---|---|---|
| 0 < t <= 20 | ON | ON | ON | Normal |
| 20 < t <= 30 | ON | ON | Blinking | Blinking on for 500 milliseconds, off for 500 milliseconds |
| 30 < t | OFF | OFF | OFF | Timeout, return to audience mode |

In Table 2, the first event (e.g., normal) occurs during the first twenty seconds (e.g., 0<t<=20) after one of the gender input buttons 410, 412 is pushed. The second event (e.g., Blinking on for 500 milliseconds, off for 500 milliseconds) is during the next ten seconds (e.g., 20<t<=30). The third event (e.g., Timeout, return to audience and/or normal mode) occurs after thirty seconds. In other examples disclosed herein, each of the first, second, and/or third event may be any suitable duration. Likewise, during the second event, blinking may occur for any suitable duration (e.g., 400 milliseconds, etc.). Such an example timeout occurring after the last button push may place the remote control device 401 in example audience mode, rather than visitor mode.

The example selection button 416 is implemented as a tactile button. In other examples disclosed herein, the select button 416 may be implemented using any suitable input interface such as, for example, a touch screen, mechanical buttons, etc. The example cancel button 418 is implemented as a tactile button. In other examples disclosed herein, the cancel button 418 may be implemented using any suitable input interface such as, for example, a touch screen, mechanical buttons, etc.

In the example illustrated in FIG. 4A, the transmitter 408 is an IR transmitter. For example, the transmitter 408 includes a plastic cover that is transparent to IR wavelength light. Additionally, the transmitter 408 includes an IR diode configured to pass digital data (e.g., a digital code) to the meter 114 (FIG. 1). In other examples disclosed herein, the transmitter may be implemented using any suitable method for data communication such as, for example, a Bluetooth® transceiver, a wireless access point (WAP) transceiver, etc.

In FIG. 4B, the remote control device 403 includes the audience management controller 116 (FIG. 1), an example numeric keypad 420, an example confirmation button 422, an example viewer entry section 424, and an example transmitter 426. In the example illustrated in FIG. 4B, the remote control device 403 further includes example accessibility buttons 438, 440, 442. In examples disclosed herein, the accessibility buttons 438, 440, 442 illustrate example buttons implemented to comply with international remote control device standards. For example, the accessibility buttons 438, 440, 442 may be utilized to indicate the audience family is not present in the household (e.g., gone on vacation, on holiday, etc.), the audience family has left the media device 110 on while not present (e.g., utilized for households that play media for pets, no one over an age threshold is in the viewing area, etc. In other examples disclosed herein, the remote control device 403 may include any suitable number of accessibility buttons.

The example numeric keypad 420 of FIG. 4B includes numeric buttons 0-9. In examples disclosed herein, the numeric keypad 420 may be implemented using any suitable numeric keypad interface such as, for example, a touch screen, tactile buttons, mechanical buttons, etc., to be utilized by an audience member (e.g., any of the panelists 104, 106 of FIG. 1 and/or any guest audience member) to enter numerical value. In examples disclosed herein, an audience member (e.g., any of the panelists 104, 106 of FIG. 1 and/or any guest audience member) may utilize the numeric keypad 420 to enter a desired channel (e.g., a numerical indication of a television channel to view), an age value (e.g., an age value to identify proper audience member age demographics), etc. In examples disclosed herein, the audience management controller 116 processes input to the numeric keypad 420 to transmit data via an IR signal from the transmitter 426.

In the example illustrated in FIG. 4B, the confirmation button 422 is implemented as tactile button on the remote control device 403. In other examples disclosed herein, the confirmation button 422 may be implemented using any suitable interface such as, for example, a touch screen, a mechanical button, etc. The confirmation button 422 of FIG. 4B is illustrated having the text "OK." In other examples disclosed herein, the confirmation button 422 may include any suitable text, character, symbol, etc., suitable to indicate a confirmation selection. For example, the confirmation button 422 may be implemented having a checkmark. In examples disclosed herein, the audience management controller 116 processes input to the confirmation button 422 to alter operation of the remote control device 403 and/or transmit data in a macro message via an IR signal from the transmitter 426.

In the example illustrated in FIG. 4B, the viewer entry section 424 includes example gender input buttons 428, 430, an example display 432, an example selection button 434, and an example cancel button 436. The example gender input buttons 428, 430 correspond to female and male, respectively. In examples disclosed herein, the gender input buttons 428, 430 are tactile buttons. In other examples disclosed herein, the gender input buttons 428, 430 may be implemented using any suitable input interface such as, for example, a touch screen, mechanical buttons, etc.

The example display 432 is implemented using a backlit LCD screen. The display 432 is configured to illuminate numerical values corresponding to an age input. For example, when a guest audience member enters an age value, the display 432 is configured to illuminate such corresponding numerical values. In other examples disclosed herein, the display 432 may be implemented using any suitable method and/or device for displaying and/or otherwise illuminating input values such as, for example, a LED display, a plasma display, a projector, an analog display and/or otherwise monitor, etc.

In the example illustrated in FIG. 4B, the gender input buttons 428, 430 and the display 432 may be illuminated in a manner described above, in connection with Table 2. Such an example timeout occurring after the last button push may place the remote control device 403 in example audience mode, rather than visitor mode.

The example selection button 434 is implemented as a tactile button. In other examples disclosed herein, the select button 434 may be implemented using any suitable input interface such as, for example, a touch screen, mechanical buttons, etc. The example cancel button 436 is implemented as a tactile button. In other examples disclosed herein, the cancel button 436 may be implemented using any suitable input interface such as, for example, a touch screen, mechanical buttons, etc.

In the example illustrated in FIG. 4B, the transmitter 426 is an IR transmitter. For example, the transmitter 426 includes a plastic cover that is transparent to IR wavelength light. Additionally, the transmitter 426 includes an IR diode configured to pass digital data (e.g., a digital code) to the meter 114 (FIG. 1). In other examples disclosed herein, the transmitter may be implemented using any suitable method for data communication such as, for example, a Bluetooth® transceiver, a WAP transceiver, etc.

Figure 5:
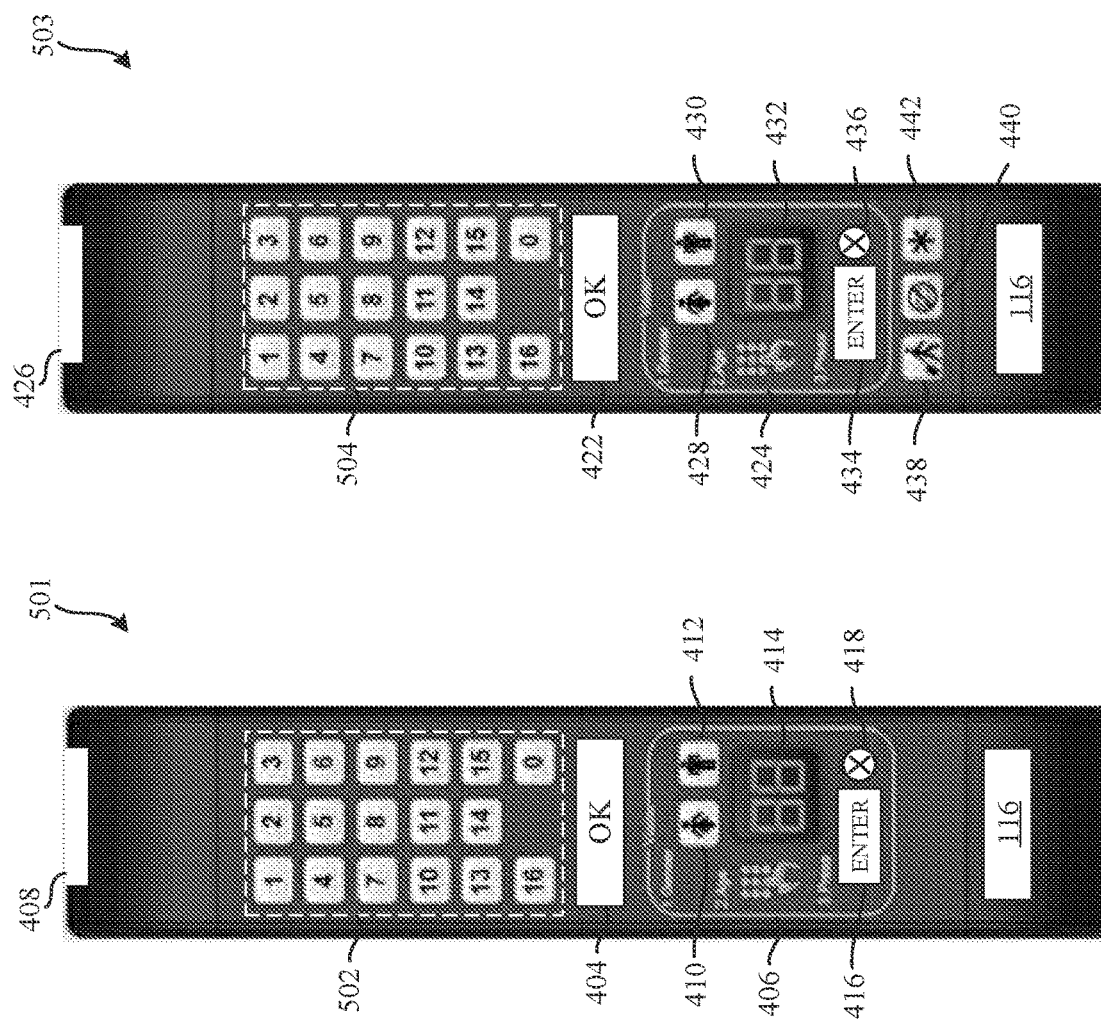
FIGS. 5A-5B illustrate third and fourth example versions of the remote control device of FIG. 1.

FIGS. 5A-5B illustrate first and second example versions of the remote control device 115 of FIG. 1. FIG. 5A includes a third example remote control device 501. FIG. 5B includes a fourth example remote control device 503. In examples disclosed herein, any of the remote control device 501 and/or the remote control device 503 illustrated in FIGS. 5A and/or 5B, respectively, may be utilized to implement the remote control device 115 of FIG. 1.

In the example illustrated in FIG. 5A, the remote control device 501 includes the example the audience management controller 116 (FIG. 1) and an example numeric keypad 502. The example remote control device 501 also includes the example confirmation button 404, the example viewer entry section 406, the example transmitter 408, the example gender input buttons 410, 412, the example display 414, the example selection button 416, and the example cancel button 418 described above in connection with the example remote control device 401 of FIG. 4A. However, in the example remote control device 501 of FIG. 5A, the numerical keypad 502 includes numeric buttons 0-16. In examples disclosed herein, the numeric keypad 502 may be implemented using any suitable numeric keypad interface such as, for example, a touch screen, tactile buttons, mechanical buttons, etc., to be utilized by an audience member (e.g., any of the panelists 104, 106 of FIG. 1 and/or any guest audience member) to enter numerical value. In examples disclosed herein, an audience member (e.g., any of the panelists 104, 106 of FIG. 1 and/or any guest audience member) may utilize the numeric keypad 502 to enter a desired channel (e.g., a numerical indication of a television channel to view), an age value (e.g., an age value to identify proper audience member age demographics), etc. In examples disclosed herein, the audience management controller 116 processes input to the numeric keypad 502 to transmit data via an IR signal from the transmitter 408.

In the example illustrated in FIG. 5B, the remote control device 503 includes the example the audience management controller 116 (FIG. 1) and, an example numeric keypad 504. The example remote control device 501 also includes the example confirmation button 422, the example viewer entry section 424, the example transmitter 426, the example gender input buttons 428, 430, the example display 432, the example selection button 434, the example cancel button 436, and the example accessibility buttons 438, 440, 442 described above in connection with the example remote control device 403 of FIG. 4B. However, in the example remote control device 503 of FIG. 5B, the numerical keypad 504 includes numeric buttons 0-16. In examples disclosed herein, the numeric keypad 504 may be implemented using any suitable numeric keypad interface such as, for example, a touch screen, tactile buttons, mechanical buttons, etc., to be utilized by an audience member (e.g., any of the panelists 104, 106 of FIG. 1 and/or any guest audience member) to enter numerical value. In examples disclosed herein, an audience member (e.g., any of the panelists 104, 106 of FIG. 1 and/or any guest audience member) may utilize the numeric keypad 504 to enter a desired channel (e.g., a numerical indication of a television channel to view), an age value (e.g., an age value to identify proper audience member age demographics), etc. In examples disclosed herein, the audience management controller 116 processes input to the numeric keypad 504 to transmit data via an IR signal from the transmitter 426.

Figure 6:
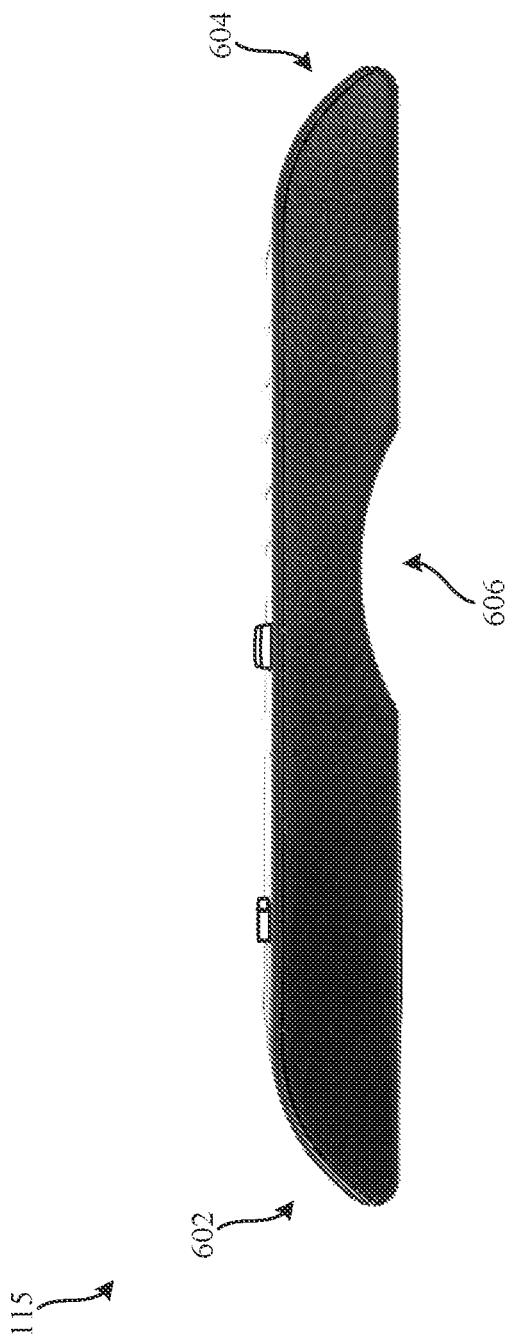
FIG. 6 illustrates an example cross-sectional view of the remote control device of FIG. 1.

FIG. 6 illustrates an example cross-sectional view of the remote control device 115 of FIG. 1. The cross-sectional view of the remote control device 115 includes example arches 602 and 604. In examples disclosed herein, the arches 602 and 602 resemble the cross-sectional shape of the meter 114 illustrated in FIGS. 1, 2, and/or 3. In other examples disclosed herein, the cross-sectional shape of the remote control device 115 may be any suitable cross-sectional shape such as, for example, a rectangular cross-section, a triangular cross section, etc.

Additionally, the remote control device 115, as illustrated in FIG. 6, includes an example dome-shaped notch 606. In examples disclosed herein, the dome-shaped notch 606 provides an ergonomically friendly indentation for an audience member (e.g., any one of the panelists 104, 106 of FIG. 1, and/or any guest audience member) to hold the remote control device 115. In other examples disclosed herein, the dome-shaped notch 606 may be implemented using any suitable cross-sectional shape and/or number of dome-shaped notches.

Figure 7:
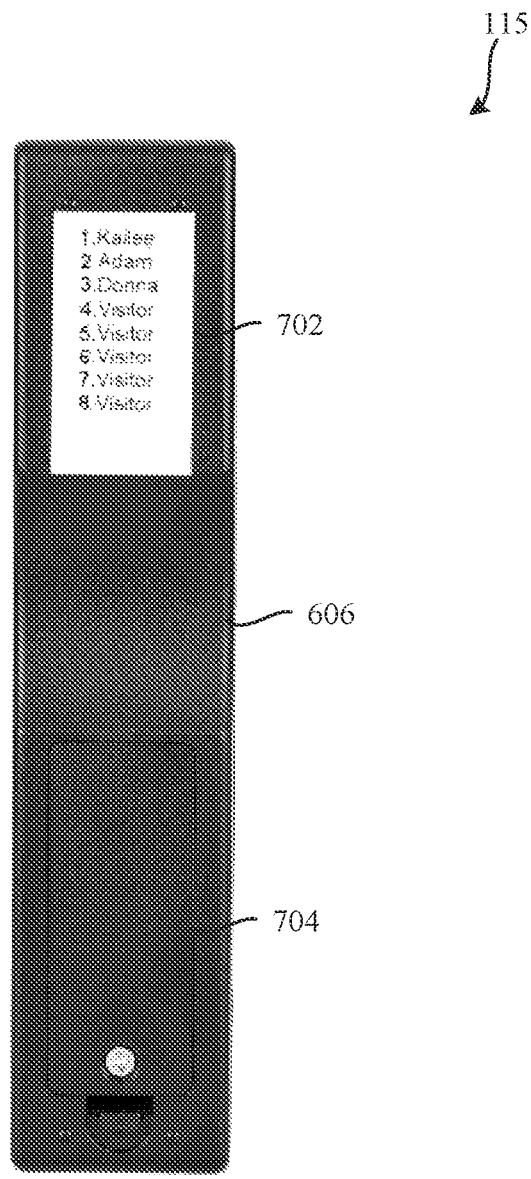
FIG. 7 illustrates an example view of the back-side of the remote control device of FIG. 1.

FIG. 7 illustrates an example view of the back-side of the remote control device 115 of FIG. 1. The remote control device 115, as illustrated in FIG. 7, includes an example label section 702. In examples disclosed herein, the label section 702 may include printed labels including the names of all audience members registered as panelists in the home (e.g., audience members associated with slots 1-3). For example, the label section 702 may include a list of each audience member (e.g., slots 1-3) and their corresponding identification number. Furthermore, the label section 702 includes example slots 4-8 to be subsequently filled in for guest audience members. In other examples disclosed herein, any suitable number of slots may be implemented in the label section 702. In other examples disclosed herein, the label section 702 may be implemented using any suitable display interface such as, for example, a LED display, an LCD display, a plasma display, an analog display and/or otherwise monitor, etc.

Further, the example remote control device 115 illustrated in FIG. 7 includes the dome-shaped notch 606 of FIG. 6. In the illustrated example, the dome-shaped notch 606 helps ensure any label placed on the label section 702 can be consistently placed in the same location.

The example remote control device 115, as illustrated in FIG. 7, includes an example door 704. In examples disclosed herein, the door 704 is configured to cover and/or otherwise provide removable access to components in the remote control device 115. For example, the door 704 may cover and/or otherwise provide removable access to batteries (e.g., double-a batteries, triple-a batteries, etc.).

While the remote control device 115, as illustrated in FIGS. 4A, 4B, 5A, 5B, 6, and 7 are implemented in the English language, any suitable language may be utilized.

Figure 8:
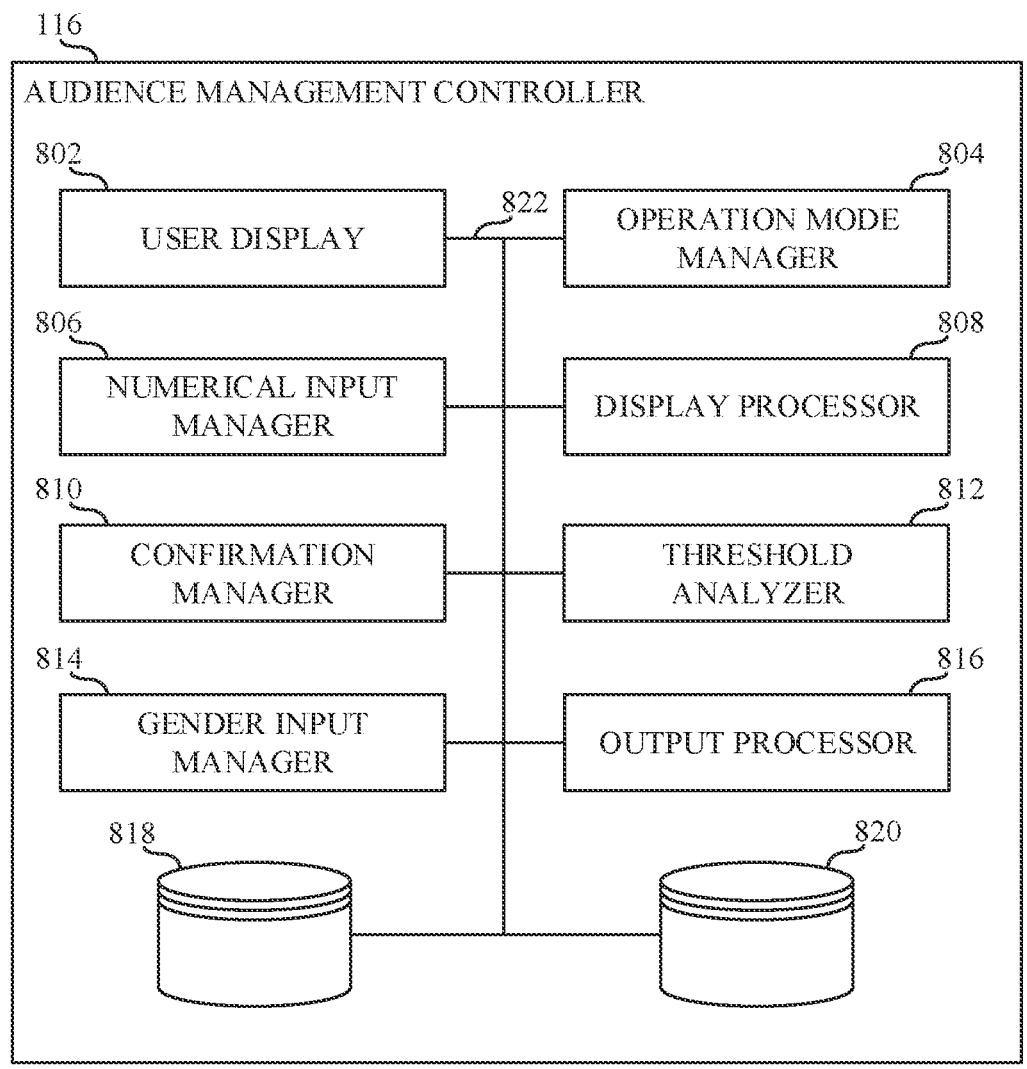
FIG. 8 is a block diagram of an example implementation of an example audience management controller included in the example remote control device of FIGS. 1, 4A, 4B, 5A, 5B, 6, 7, and/or 8.

FIG. 8 is a block diagram of an example implementation of the example audience measurement controller 116 of FIG. 1. The audience measurement controller 116 of FIG. 8 includes an example user display 802, an example operation mode manager 804, an example numerical input manager 806, an example display processor 808, an example confirmation manager 810, an example threshold analyzer 812, an example gender input manager 814, an example output processor 816, an example first database 818, and an example second database 820. In the example of FIG. 8, any of the user display 802, the operation mode manager 804, the numerical input manger 806, the display processor 808, the confirmation manager 810, the threshold analyzer 812, the gender input manager 814, the output processor 816, the first database 818, and/or the second database 820 may communicate via an example communication bus 822. In examples disclosed herein, the communication bus 822 may be implemented using any suitable wired and/or wireless communication method, apparatus, and/or device.

In the example illustrated in FIG. 8, the user display 802 implements the example display 414 and/or the display 432 of FIGS. 4A, 4B, 5A, 5B. In other examples disclosed herein, the user display 802 may be implemented using any suitable interface and/or display such as, for example, a graphical user display (GUI), a digital display panel (e.g., a numerical display panel), etc., configured to display entries selected by an panelist audience member and/or guest audience member. For example, the user display 802 may be a numerical display configured to display numerical values input by an audience member. In examples disclosed herein, a guest audience member may input the guest's age and, as such, the user display 802 may display the entered values. In this manner, the audience member may be able to visually confirm on the remote control device 115 (e.g., the remote control device 401, 403, 501, 503) whether the numerical values have been entered properly. In examples disclosed herein, the user display 802 may be an example means for displaying.

In FIG. 8, the example operation mode manger 804 is configured to determine whether to operate the remote control device 115 in visitor mode. As used herein, visitor mode corresponds to a mode of operation occurring when an audience member is a guest audience member. For example, if a guest audience member enters the viewing area, such a guest audience member may select a button on the remote control device 115 (e.g., the remote control device 401, 403, 501, 503) indicating the remote control device 115 is to operate in visitor mode. For example, a guest audience member may select an example gender input button (e.g., any of the gender input buttons 410, 412 (FIG. 4A), 428, 430 (FIG. 4B)). By selecting one of the example gender input buttons (e.g., any of the gender input buttons 410, 412 (FIG. 4A), 428, 430 (FIG. 4B)), the operation mode manager 804 may determine that the remote control device 115 (e.g., the remote control device 401, 403, 501, 503) is to operate in an example visitor mode. In examples disclosed herein, entering visitor mode (e.g., an audience member and/or guest audience member selecting any of the gender input buttons 410, 412 (FIG. 4A), 428, 430 (FIG. 4B)) may not trigger the transmission of an infrared signal to the meter 114. In some examples disclosed herein, the operation mode manager 804 may determine that the remote control device 115 (e.g., the remote control device 401, 403, 501, 503) is operating in visitor mode responsive to any predetermined selection of, or series of selections of, buttons on the remote control device 115 (e.g., the remote control device 401, 403, 501, 503).

Furthermore, in examples disclosed herein, the operation mode manager 804 is configured to identify whether the example cancel button 418, 436 is selected. If the remote control device 115 (e.g., the remote control device 401, 403, 501, 503) is operating in visitor mode, and the cancel button 418, 436 is selected, the operation mode manager 804 may determine the cancel button 418, 436 has been selected. Similarly, the cancel button 418, 436 may be illuminated. For example, the cancel button 418, 436 may be illuminated for a predetermined period of time (e.g., 0.75 seconds, 2 seconds, etc.). Accordingly, the display processor 808 may indicate to turn off the user display 802 and the operation mode manager 804 may set the operation mode of the remote control device 115 (e.g., the remote control device 401, 403, 501, 503) to be in an example audience member mode, rather than visitor mode. As used herein, audience member mode corresponds to a normal operational mode of the remote control device 115 (e.g., the remote control device 401, 403, 501, 503). For example, while in audience member mode, the remote control device 115 (e.g., the remote control device 401, 403, 501, 503) may change settings of the media device 110 (e.g., change channels, change volume, etc.,) and/or log in audience members registered as panelists. In examples disclosed herein, the operation mode manager 804 may be an example means for managing.

In the example illustrated in FIG. 8, the numerical input manager 806 is to determine whether a numerical keypress is detected. For example, the numerical input manager 806 is configured to determine whether any of the numerical buttons in the numeric keypad 402, 420, 502, 504 (FIGS. 4A, 4B, 5A, 5C) is pressed. In example visitor mode operation, the received numerical keypress may correspond to a guest audience member's age. Responsive to identifying the numerical keypress being associate with a particular value (e.g., between 0 and 9 for numeric keypads 402 and 420, and between 0 and 16 for numeric keypads 502 and 504), the numerical input manager 806 transmits such identified keypress to the display processor 808. For example, the numerical input manager 806 identifies the numerical keypress and transmits such identification to the display processor 808 to be illuminated on the user display 802. In examples disclosed herein, the input manager 806 may be an example means for input managing.

In FIG. 8, the example display processor 808 obtains the numerical keypress from the numerical input manager 806 and illuminates a corresponding numerical value in the user display 802. In examples disclosed herein, the display processor 808 is configured to left-shift the numerical value in the user display 802. For example, if the user display 802 currently shows "72," and the numerical input manger 806 identifies a numerical keypress of "4," then the display processor 808 is configured to cause the value "24" to be displayed on the user display 802. In an example in which the numerical keypad of the remote control device includes two-digit values (e.g., a 0-16 keypad), if the user display 802 shows "72," and the numerical input manger 806 identifies a numerical keypress of "16," then the display processor 808 is configured to cause the value "16" to be displayed on the user display 802. In examples disclosed herein, the display processor 808 may be an example means for displaying.

In further examples disclosed herein, when the numerical keypress corresponding to an audience member and/or guest audience member's age does not satisfy a threshold value, and the example confirmation manager 810 identifies a confirmation keypress has been entered, the display processor 808 is configured to display an error indicator (e.g., dashes) on the user display 802. For example, if a guest audience member enters the value 0 (e.g., 0 being less than a threshold value), and subsequently enters confirm, the display processor 808 is configured to display the error indicator (e.g., dashes) on the user display 802. In some examples, when the numerical keypress corresponding to an audience member and/or guest audience member's age satisfies a threshold value, and the example confirmation manager 810 identifies a confirmation keypress has been entered, the display processor 808 is configured to display and/or otherwise illuminate the corresponding age value on the user display 802. For example, if a guest audience member enters the value "19," and subsequently enters confirm, the display processor 808 is configured to display the value "19" on the user display 802.

Furthermore, the display processor 808 is configured to illuminate a light responsive to the gender input manager 814 identifying a gender input value is received. In examples disclosed herein, once such identified age values and/or gender values have been received and transmitted to the meter 114, the display processor 808 may turn off the user display 802.

In FIG. 8, the example confirmation manager 810 is to determine whether a confirmation keypress is received. For example, the confirmation manager 810 is configured to determine whether the confirmation button 404, 422 (FIGS. 4A, 4B, 5A, 5B) is pressed. In examples disclosed herein, if the confirmation manager 810 determines the confirmation button 404, 422 (FIGS. 4A, 4B, 5A, 5B) is pressed, then such an indication is transmitted to the threshold analyzer 812 to determine whether the entered numerical keypress values (e.g., the numerical keypress values corresponding to age) satisfies a threshold value. In an example operation, responsive to the confirmation manager 810 identifying that the confirmation button 404, 422 (FIGS. 4A, 4B, 5A, 5B) is pressed, the confirmation button 404, 422 (FIGS. 4A, 4B, 5A, 5B) may be illuminated. For example, the confirmation button 404, 422 (FIGS. 4A, 4B, 5A, 5B) may be illuminated for a predetermined period of time (e.g., 0.75 seconds, 2 seconds, etc.). In examples disclosed herein, the confirmation manager 810 may be an example means for confirmation managing.

In the example illustrated in FIG. 8, the threshold analyzer 812 is to, responsive to a numerical keypress being identified from the numerical input manager 806, determine whether the value associated with the numerical keypress satisfies a threshold. For example, the threshold analyzer is configured to determine whether the numerical keypress is greater than or equal to 1. Such an indication is sent to either the display processor 808 to illuminate dashes (e.g., when the numerical keypress does not satisfy the threshold), or to the output processor 816 (e.g., when the numerical keypress does satisfy the threshold). In examples disclosed herein, the analyzer 812 may be an example means for analyzing.

In the example of FIG. 8, the gender input manager 814 is to determine whether a gender input keypress is received. For example, the gender input manager 814 is configured to determine whether any of the gender input buttons 410, 412, 428, 430 (FIGS. 4A, 4B, 5A, 5B) is pressed. Responsive to identifying that a gender input keypress is received, the gender input manager 814 is configured to store such a gender value in the second database 820. In examples disclosed herein, the gender input manger 814 may be an example means for gender input managing.

In an alternate example disclosed herein, responsive to the operation mode manger 804 determining to not operate in an example visitor mode, the gender input manger 814 may determine whether a gender input keypress is received. For example, if the remote control device 115 (e.g., the remote control device 401, 403, 501, 503) is not operating in visitor mode, the gender input manager 814 is configured to determine whether any of the gender input buttons 410, 412, 428, 430 (FIGS. 4A, 4B, 5A, 5B) is pressed and, in response, indicate to the operation mode manager 804 that operation is to transition into the visitor mode. Responsive to identifying that a gender input keypress is received, the gender input manager 814 is configured to store such a gender value in the second database 820. Further in such an example, the example display processor 808 is configured to display dashes on the user display 802 and subsequently illuminate a backlight in the remote control device 115 (e.g., the remote control device 401, 403, 501, 503). Additionally, the example numerical input manger 806 is configured to store an age value of 0 in the first database 818. Alternatively in such an example, responsive to the operation mode manager 804 determining to not operate in an example visitor mode, and the gender input manager 814 determining a gender input keypress is not received, the output processor 816 is configured to transmit the keypress to the media unit 110 and/or the meter 114 via a transmitter (e.g., the transmitter 408, 426 (FIGS. 4A, 4B, 5A, 5B) via a macro message.

In the example illustrated in FIG. 8, the output processor 816 is configured to generate an example macro message to be transmitted to the media unit 110 and/or the meter 114. In examples disclosed herein, the output processor 816 is configured to provide the macro message to a transmitter (e.g., the transmitter 408, 426 (FIGS. 4A, 4B, 5A, 5B)) to be transmitted to the media unit 110 and/or the meter 114. In other examples disclosed herein, the output processor 816 may implement the example transmitter 408, 426 (FIGS. 4A, 4B, 5A, 5B). For example, the output processor 816 may be configured to transmit the example confirmed age values and/or confirmed gender values to the meter 114. In examples disclosed herein, the output processor 816 may be an example means for processing.

In examples disclosed herein, the output processor 816 is configured to generate example macro messages in the form of RC-5 codes. In examples disclosed herein, the macro messages are in a unique timing format. For example, a macro message includes a number, "N," of message fields transmitted as individual RC-5 codes. In examples disclosed herein, the "N" message fields may be the following message fields, shown below in Table 3.

TABLE 3

| Index | Message Field (as RC-5 code) | Description |
|---|---|---|
| 1 | Macro ID | Identifies the type of Macro Message |
| 2 | Data[0] MSB | Data payload (numerical values 0-9) |
| ... | ... | ... |
| N + 1 | Data[N − 1] LSB | Data payload (numerical values 0-9) |

In examples disclosed herein, the number of data items (e.g., the "N" data items) may be different for various macro messages. For example, a first macro message having a first macro ID of "Age Value" may include 5 data items. Likewise, a second macro message having a second macro ID of "Gender Value" may include 4 data items. In examples disclosed herein, the output processor 816 is configured to generate a macro message including each data item sequentially (e.g., one by one) as an RC-5 code. Furthermore, output processor 816 may indicate to the transmitter 408, 426 to transmit each data item separated by a pause of 20 milliseconds (ms). In examples disclosed herein, since the macro message may include any suitable number of data items, the pause between transmission of such data items may be reduced as compared to standard 100 ms pauses. For example, the output processor 816 may indicate to transmit a first data item (e.g., a Macro ID) followed by a 20 ms pause, then a second data item (e.g., Data[0] MSB), etc. Once the entire macro message is transmitted, a longer pause (e.g., 100 ms) may be applied before repeating the macro message transmission. In examples disclosed herein, the output processor 816 may repeat a macro message for a duration equivalent to, or substantially similar to, a duration in which a user holds the key that triggered the macro message.

In examples disclosed herein, the output processor 816 is configured to differentiate macro messages occurring responsive to operating in visitor mode from messages occurring during normal operation. Such a differentiation enables sending of macro messages to a meter (e.g., the meter 114) that are distinguishable from messages that may be sent during the audience mode of operation (e.g., change a channel, change volume, etc.). In examples disclosed herein, the RC-5 commands are associated with values transmitted in macro messages. For example, Table 4 illustrates example relationships between values and assigned RC-5 commands.

TABLE 4

| Value | RC-5 Command |
|---|---|
| 0 | 0x02 |
| 1 | 0x03 |
| 2 | 0x04 |
| 3 | 0x07 |
| 4 | 0x09 |
| 5 | 0x0C |
| 6 | 0x0D |
| 7 | 0x0E |
| 8 | 0x11 |
| 9 | 0x12 |

The following table, Table 5, illustrates example data entries in a macro message corresponding a visitor who is 45 years old and male.

TABLE 5

| Message Field | RC-5 Command | RC-5 Command | RC-5 Code | Meaning/Value |
|---|---|---|---|---|
| Macro ID | 0x07 | 0x3A | 0x31FA | Gender = Male |
| Data[0] | 0x07 | 0x09 | 0x31C9 | Age $1^{st}$ Digit = 4 |
| Data[1] | 0x07 | 0x0C | 0x31CC | Age $2^{nd}$ Digit = 5 |

As illustrated in Table 5, the example macro message may include the data value 0x31FA, followed by a twenty millisecond pause, followed by the data value 0x31C9, followed by a twenty millisecond pause, followed by the data value 0x31CC, followed by a one hundred millisecond pause.

The following table, Table 6, illustrates example data entries in a macro message corresponding a visitor who is 23 years old and female.

TABLE 6

| Message Field | RC-5 Address | RC-5 Command | RC-5 Code | Meaning/Value |
|---|---|---|---|---|
| Macro ID | 0x07 | 0x3B | 0x31FB | Gender = Female |
| Data[0] | 0x07 | 0x04 | 0x31C4 | Age $1^{st}$ Digit = 2 |
| Data[1] | 0x07 | 0x07 | 0x31C7 | Age $2^{nd}$ Digit = 3 |

As illustrated in Table 6, the example macro message may include the data value 0x31FB, followed by a twenty millisecond pause, followed by the data value 0x31C4, followed by a twenty millisecond pause, followed by the data value 0x31C7, followed by a one hundred millisecond pause.

In the examples illustrated in Tables 5 and/or 6, the meter 114 address is 03 (e.g., 0x07). In examples disclosed herein, the following steps may be utilized to reprogram the meter 114 address. Initially, a user may select two buttons simultaneously for a predetermined period of time. For example, a user may select both the confirmation button 404, 422 (FIGS. 4A, 4B, 5A, 5B) and any one of the gender input buttons 410, 412, 428, 430 (FIGS. 4A, 4B, 5A, 5B) simultaneously for three to five seconds. At this point, the display processor 808 may configure the display 802 to flash (e.g., flash digits 88) for a predetermined period of time. For example, the display processor 808 may configure the user display 802 to illuminate 88 for 500 milliseconds, followed by a 500 millisecond pause, for a predetermined period of time (e.g., flash four times, flash for 5 seconds, etc.). Once the display 414, 432 ceases to flash, the display processor 808 causes the user display 802 to illuminate the currently assigned meter 114 address.

In the event the meter 114 address is to be changed, a user may input a one or two digit code corresponding to the new address. In examples disclosed herein, the display processor 808 is configured to left-shift the numerical value in the user display 802. Responsive to the operation mode manager 804 determining that the confirmation button 404, 422 is pressed, the output processor 816 may indicate to transmit such a corresponding RC-5 code to reprogram the meter 114. As such, the confirmation button 404, 422 may be illuminated, the operation mode manager 804 may store the newly entered RC-5 code corresponding to the reprogrammed meter 114 address, the output processor 816 may transmit a macro message including the new meter 114 address, the display processor 808 may illuminate the new address on the user display 802, and, after a predetermined period of time, the display processor 808 may turn off any currently illuminated buttons and/or the backlit user display 802. Such a process may be canceled at any time responsive to the operation mode manager 804 determining the cancel button 418, 436 (FIGS. 4A, 4B, 5A, 5B) is pressed or that a predetermined period of time has elapsed (e.g., twenty seconds). Example operation of responsive actions taken by the meter 114 when a macro message indicating to reprogram the meter 114 code is described above.

The following table, Table 7, illustrates example data entries in a macro message corresponding to a macro ID for reprogramming the meter 114 address.

TABLE 7

| Macro ID | RC-5 Command |
| --- | --- |
| Change Meter Address | 0x3D |

In Table 7, a macro message corresponding to a reprogramming request may be initiated with the data entry 0x3D.

The following table, Table 8, illustrates example data entries in a macro message corresponding to a request to reprogram the meter 114 address to 0x10 (e.g., decimal value 16).

TABLE 8

| Message Field | RC-5 Address | RC-5 Command | RC-5 Code | Meaning/Value |
| --- | --- | --- | --- | --- |
| Macro ID | 0x10 | 0x3D | 0x313D | Change Meter Address |
| Data[0] | 0x10 | 0x03 | 0x3103 | Address $1^{st}$ Digit = 1 |
| Data[1] | 0x10 | 0x0D | 0x310D | Address $2^{nd}$ Digit = 6 |

As illustrated in Table 8, the example macro message may include the data value 0x313D, followed by a twenty millisecond pause, followed by the data value 0x3103, followed by a twenty millisecond pause, followed by the data value 0x310D, followed by a one hundred millisecond pause.

The following table, Table 9, illustrates example data entries in a macro message corresponding to a request to reprogram the meter 114 address to 0x07 (e.g., decimal value 7).

TABLE 9

| Message Field | RC-5 Address | RC-5 Command | RC-5 Code | Meaning/Value |
| --- | --- | --- | --- | --- |
| Macro ID | 0x07 | 0x3D | 0x313D | Change Meter Address |
| Data[0] | 0x07 | 0x02 | 0x31C2 | Address $1^{st}$ Digit = 0 |
| Data[1] | 0x07 | 0x0E | 0x31CE | Address $2^{nd}$ Digit = 7 |

As illustrated in Table 9, the example macro message may include the data value 0x313D, followed by a twenty millisecond pause, followed by the data value 0x31C2, followed by a twenty millisecond pause, followed by the data value 0x310E, followed by a one hundred millisecond pause.

The following table, Table 10, illustrates example data entries in a macro message corresponding to a request to reprogram the meter 114 address to 0x17 (e.g., decimal value 23).

TABLE 10

| Message Field | RC-5 Address | RC-5 Command | RC-5 Code | Meaning/Value |
| --- | --- | --- | --- | --- |
| Macro ID | 0x17 | 0x3D | 0x313D | Change Meter Address |
| Data[0] | 0x17 | 0x04 | 0x35C4 | Address $1^{st}$ Digit = 2 |
| Data[1] | 0x17 | 0x07 | 0x35C7 | Address $2^{nd}$ Digit = 3 |

As illustrated in Table 10, the example macro message may include the data value 0x313D, followed by a twenty millisecond pause, followed by the data value 0x35C4, followed by a twenty millisecond pause, followed by the data value 0x35C7, followed by a one hundred millisecond pause.

The following table, Table 11, illustrates example data entries in a macro message corresponding to a request to reprogram the meter 114 address to 0x18 (e.g., decimal value 24).

TABLE 11

| Message Field | RC-5 Address | RC-5 Command | RC-5 Code | Meaning/Value |
| --- | --- | --- | --- | --- |
| Macro ID | 0x18 | 0x3D | 0x313D | Change Meter Address |
| Data[0] | 0x18 | 0x04 | 0x3604 | Address $1^{st}$ Digit = 2 |
| Data[1] | 0x18 | 0x09 | 0x3609 | Address $2^{nd}$ Digit = 4 |

As illustrated in Table 10, the example macro message may include the data value 0x313D, followed by a twenty millisecond pause, followed by the data value 0x3604, followed by a twenty millisecond pause, followed by the data value 0x3609, followed by a one hundred millisecond pause.

In the example illustrated in FIG. 8, the first database 818 may be implemented by any device for storing data such as, for example, flash memory, magnetic media, optical media, etc. Furthermore, the data stored in the first database 818 may be in any data format such as, for example, binary data, comma delimited data, tab delimited data, structured query language (SQL) structures, etc. In examples disclosed herein, the first database 818 is configured to store example age values associated with user input. For example, the first database 818 may store data from the numerical input manager 806. In examples disclosed herein, the first database 818 may be an example first means for storing.

In the example of FIG. 8, the second database 820, may be implemented by any device for storing data such as, for example, flash memory, magnetic media, optical media, etc. Furthermore, the data stored in the second database 820 may be in any data format such as, for example, binary data, comma delimited data, tab delimited data, SQL structures, etc. In examples disclosed herein, the second database 820 is configured to store example gender values associated with user input. For example, the second database 820 may store data from the gender input manager 814. In examples disclosed herein, the second database 820 may be an example second means for storing.

While an example manner of implementing the audience management controller 116 of the remote control device 115 of FIG. 1 is illustrated in FIGS. 4A, 4B, 5A, 5B, 6, 7, and/or 8, one or more of the elements, processes and/or devices illustrated in FIGS. 1, 4A, 4B, 5A, 5B, 6, 7, and/or 8 may be combined, divided, re-arranged, omitted, eliminated and/or implemented in any other way. Further, the example user display 802, the example operation mode manager 804, the example numerical input manager 806, the example display processor 808, the example confirmation manager 810, the example threshold analyzer 812, the example gender input manager 814, the example output processor 816, the example first database 818, the example second database 820, and/or, more generally, the example audience management controller 116 of the remote control device 115 of FIGS. 1, 4A, 4B, 5A, 5B, 6, 7, and/or 8 may be implemented by hardware, software, firmware and/or any combination of hardware, software and/or firmware. Thus, for example, any of the example user display 802, the example operation mode manager 804, the example numerical input manager 806, the example display processor 808, the example confirmation manager 810, the example threshold analyzer 812, the example gender input manager 814, the example output processor 816, the example first database 818, the example second database 820, and/or, more generally, the example audience management controller 116 of the remote control device 115 of FIGS. 1, 4A, 4B, 5A, 5B, 6, 7, and/or 8 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user display 802, the example operation mode manager 804, the example numerical input manager 806, the example display processor 808, the example confirmation manager 810, the example threshold analyzer 812, the example gender input manager 814, the example output processor 816, the example first database 818, the example second database 820, and/or, more generally, the example audience management controller 116 of the remote control device 115 of FIGS. 1, 4A, 4B, 5A, 5B, 6, 7, and/or 8 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience management controller 116 of the example remote control device 115 of FIGS. 1, 4A, 4B, 5A, 5B, 6, 7, and/or 8 may include one or more elements, processes and/or devices in addition to, or instead of, those illustrated in FIGS. 1, 4A, 4B, 5A, 5B, 6, 7, and/or 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
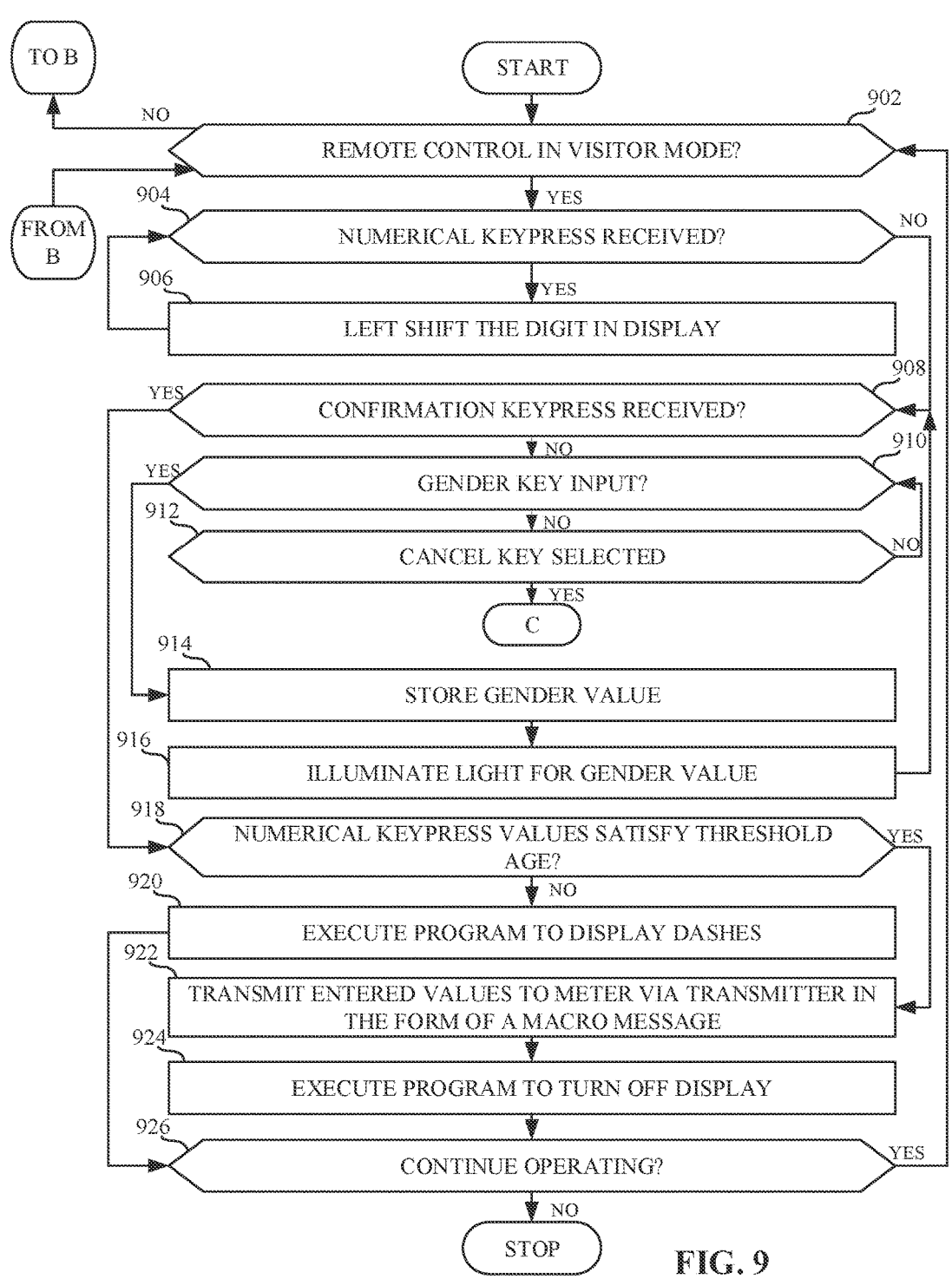
FIG. 9 is an example flowchart representative of example machine readable instructions that may be executed by the example audience measurement controller of FIGS. 1, 4A, 4B, 5A, 5B, 6, 7, and/or 8.
Figure 10:
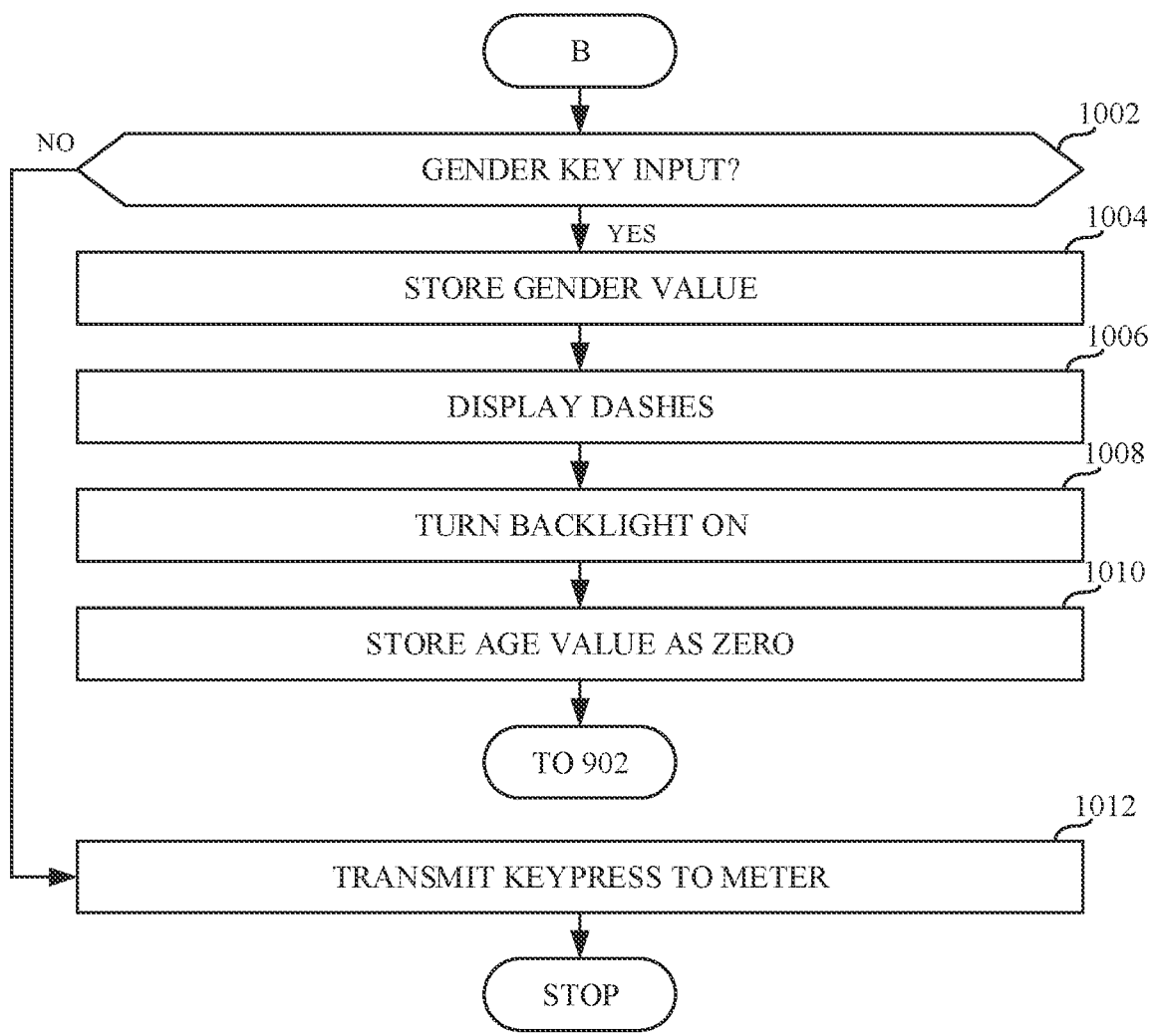
FIG. 10 is an example flowchart representative of example machine readable instructions that may be executed by the example audience measurement controller of FIGS. 1, 4A, 4B, 5A, 5B, 6, 7, and/or 8 when operating in an example audience mode.

Flowcharts representative of example hardware logic, machine readable instructions, hardware implemented state machines, and/or any combination thereof for implementing the audience management controller 116 of the remote control device 115 of FIGS. 1, 4A, 4B, 5A, 5B, 6, 7, and/or 8 are shown in FIGS. 9, 10, and/or 11. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9, 10, and/or 11, many other methods of implementing the example the audience management controller 116 of the example remote control device 115 of FIGS. 1, 4A, 4B, 5A, 5B, 6, 7, and/or 8 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 9, 10, and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is an example flowchart representative of example machine readable instructions that may be executed by the example audience measurement controller 116 of FIGS. 1, 4A, 4B, 5A, 5B, 6, 7, and/or 8. In the example illustrated in FIG. 9, the example operation mode manger 804 is configured to determine whether to operate in visitor mode. (Block 902). For example, the operation mode manager 804 determines whether an audience member has indicated to operate the remote control device 115 (e.g., the remote control device 401, 403, 501, 503) in visitor mode. In response to the operation mode manager 804 determining to not operate in visitor mode (e.g., the control of block 902 returns a result of NO), control proceeds to instruction identified by flowchart B, described below in connection with FIG. 10.

However, in response to the operation mode manager 804 determining to operating in visitor mode (e.g., the control of block 902 returns a result of YES), the numerical input manager 806 is to determine whether a numerical keypress is received. (Block 904). In response to the numerical input manager 806 determining a numerical keypress is received (e.g., the control of block 904 returns a result of YES), the example display processor 808 obtains the numerical keypress from the numerical input manager 806 and left-shifts the numerical value in the user display 802. (Block 906). Responsive to the control executed in block 906, control returns to block 904 to determine whether a numerical keypress is received.

When the numerical input manager 806 determines a numerical keypress is not received (e.g., the control of block 904 returns a result of NO), the example confirmation manager 810 determines whether a confirmation keypress is received. (Block 908). For example, the confirmation manager 810 is configured to determine whether of the confirmation button 404, 422 (FIGS. 4A, 4B, 5A, 5B) is pressed.

In examples disclosed herein, if the confirmation manager 810 determines the confirmation button 404, 422 (FIGS. 4A, 4B, 5A, 5B) is pressed (e.g., the control of block 908 returns a result of YES), then such an indication is transmitted to the threshold analyzer 812 to determine whether the entered numerical keypress values (e.g., the numerical keypress values corresponding to age) satisfies a threshold value. (Block 918). Control of block 918 is explained in further detail below.

However, if the confirmation manager 810 determines the confirmation button 404, 422 (FIGS. 4A, 4B, 5A, 5B) is not pressed (e.g., the control of block 908 returns a result of NO), the gender input manager 814 determines whether a gender input keypress is received. (Block 910). For example, the gender input manager 814 is configured to determine whether any of the gender input buttons 410, 412, 428, 430 (FIGS. 4A, 4B, 5A, 5B) is pressed. Responsive to identifying that a gender input keypress is received (e.g., the control of block 910 returns a result of YES), the gender input manager 814 is configured to store such a gender value in the second database 820. (Block 914). Furthermore, responsive to the control executed in block 914, the display processor 808 illuminates a light responsive corresponding to the gender input value. (Block 916). Control then returns to block 908.

Responsive to identifying that a gender input keypress is not received (e.g., the control of block 910 returns a result of NO), the operation mode manager 804 is configured to identify whether the example cancel button 418, 436 is selected. (Block 912). In the event the operation mode manager 804 determines the cancel button 418, 436 is not selected (e.g., the control of block 912 returns a result of NO), control returns to block 910. Alternatively, in the event the operation mode manager 804 determines the cancel button 418, 436 is selected (e.g., the control of block 912 returns a result of YES), control proceeds to instruction identified by flowchart C, described below in connection with FIG. 11.

As mentioned above, responsive to the confirmation manager 810 determining the confirmation button 404, 422 (FIGS. 4A, 4B, 5A, 5B) is pressed (e.g., the control of block 908 returns a result of YES), the threshold analyzer 812 determines whether the entered numerical keypress values (e.g., the numerical keypress values corresponding to age) satisfies a threshold value. (Block 918). In the event the threshold analyzer 812 determines the numerical keypress values (e.g., the numerical keypress values corresponding to age) does not satisfy a threshold age value (e.g., the control of block 918 returns a result of NO), the display processor 808 displays dashes on the user display 802. (Block 920). However, when the threshold analyzer 812 determines the numerical keypress values (e.g., the numerical keypress values corresponding to age) does satisfy a threshold age value (e.g., the control of block 918 returns a result of YES), the output processor 816 is configured to indicate to transmit example entered values to the media unit 110 and/or the meter 114 via the transmitter 408, 426 in the form of a macro message. (Block 922). For example, the numerical input manager 806 may store the entered values (e.g., entered age values) in the first database 818. Further, the output processor 816 may generate an example macro message corresponding to the entered values. Further in such an example, the output processor 816 may generate such an example macro message as a series of RC-5 codes including at least a macro ID and the entered values. Example macro messages generated by the output processor 816 is described in further detail above. The output processor 816 subsequently provides the macro message to the transmitter 408, 426 to be transmitted to the media unit 110 and/or meter 114. Once the entered values are transmitted, the display processor 808 may execute a program to turn off the user display 802. (Block 924).

Responsive to the control executed in either blocks 920 or 924, the example audience measurement controller 116 determines whether to continue operating. (Block 926). In the event the audience measurement controller 116 determines to continue operating (e.g., the control of block 926 returns a result of YES), control returns to block 902. However, in the event the audience measurement controller 116 determines not to continue operating (e.g., the control of block 926 returns a result of NO), the process stops. In examples disclosed herein, the audience measurement controller 116 may determine to continue operating in the event a new user input is received, visitor mode is initiated again, etc. In examples disclosed herein, the audience measurement controller 116 may determine not to continue operating in the event power is lost, no new input is received, etc.

FIG. 10 is an example flowchart representative of example machine readable instructions that may be executed by the example audience measurement controller 116 of FIGS. 1, 4A, 4B, 5A, 5B, 6, 7, and/or 8 when operating in an example audience mode. Responsive to the operation mode manger 804 determining to not operate in an example visitor mode (e.g., the control of block 902 (FIG. 9) returns a result of NO), the gender input manger 814 determines whether a gender input keypress is received. (Block 1002). Responsive to the gender input manager 814 identifying that a gender input keypress is received (e.g., the control of block 1002 returns a result of YES), the gender input manager 814 stores such a gender value. (Block 1004). For example, the gender input manager 814 may store such a gender value in the second database 820. Further in such an example, the example display processor 808 is configured to display dashes on the user display 802. (Block 1006). Additionally, the display processor 808 is configured to illuminate a backlight in the remote control device 115 (e.g., the remote control device 401, 403, 501, 503). (Block 1008). Responsive to, or in parallel to, the control executed in block 1008, the numerical input manger 806 stores an age value of 0. (Block 1010). For example, the numerical input manager 806 may store an age value of 0 in the first database 818. Responsive to the control executed in block 1010, control returns to block 902 of FIG. 9.

However, in such an example, responsive to the operation mode manager 804 determining a gender input keypress is not received (e.g., the control of block 1002 returns a result of NO), the output processor 816 is configured to indicate to the transmitter 408, 426 to transmit the keypress to the media unit 110 and/or the meter 114. (Block 1012). Responsive to the control executed in block 1012, control stops.

Figure 11:
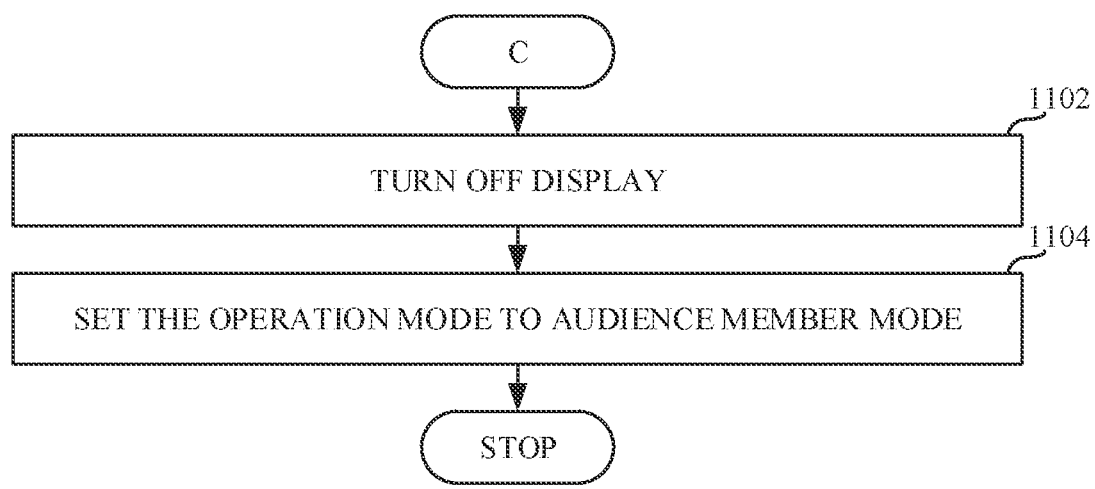
FIG. 11 is an example flowchart representative of example machine readable instructions that may be executed by the example audience measurement controller of FIGS. 1, 4A, 4B, 5A, 5B, 6, 7, and/or 8 when a cancel keypress is identified.

FIG. 11 is an example flowchart representative of example machine readable instructions that may be executed by the example audience measurement controller 116 of FIGS. 1, 4A, 4B, 5A, 5B, 6, 7, and/or 8 when a cancel keypress is identified. Accordingly, the display processor 808 may indicate to turn off the user display 802. (Block 1102). Additionally, the operation mode manager 804 may set the operation mode of the remote control device 115 to be in an example audience member mode, rather than visitor mode. (Block 1104). The process then stops.

Figure 12:
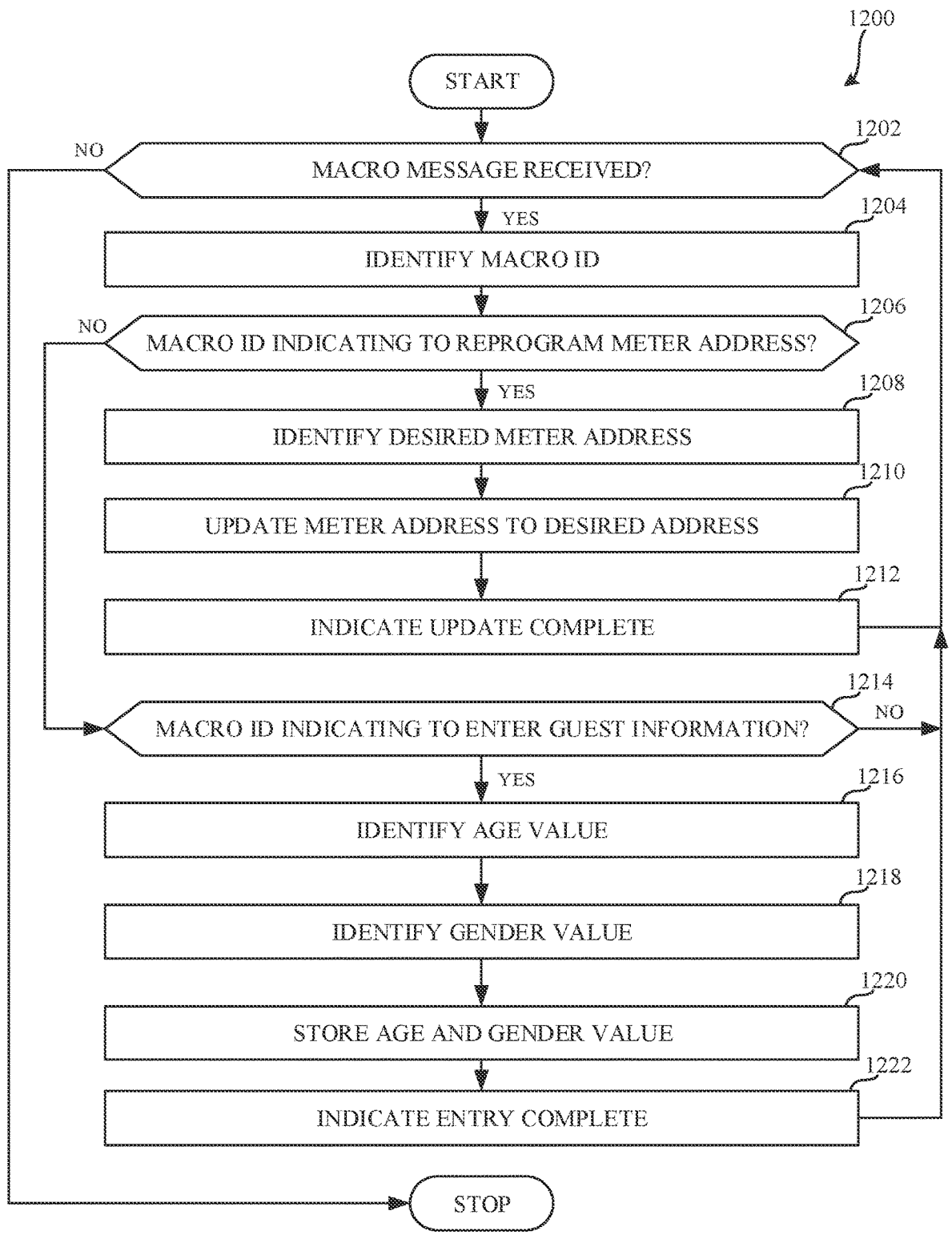
FIG. 12 is an example flowchart representative of example machine readable instructions that may be executed by the meter of FIGS. 1, 2, and/or 3 when a macro message is obtained.

A flowchart representative of example hardware logic, machine readable instructions, hardware implemented state machines, and/or any combination thereof for implementing the meter 114 of FIGS. 1, 2, and/or 3 is shown in FIG. 12.

The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 12, many other methods of implementing the example the meter 114 of FIGS. 1, 2, and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 12 is an example flowchart representative of example machine readable instructions 1200 that may be executed by the meter 114 of FIGS. 1, 2, and/or 3 when a macro message is obtained. In FIG. 12, the example meter 114 determines whether a macro message is received. (Block 1202). In the event the meter 114 determines a macro message is not received (e.g., the control of block 1202 returns a result of NO), the process stops. Alternatively, in the event the meter 114 determines a macro message is not received (e.g., the control of block 1202 returns a result of NO), the process may continue to wait.

In the event the meter 114 determines a macro message is received (e.g., the control of block 1202 returns a result of YES), the meter identifies the macro ID in the macro message. (Block 1204). As such, the meter 114 determines whether the macro ID indicates to reprogram the meter 114 address. (Block 1206). In the event the meter 114 determines the macro ID indicates to reprogram the meter 114 address (e.g., the control of block 1206 returns a result of YES), the meter 114 identifies the desired meter address. (Block 1208). Additionally, the meter 114 updates the meter 114 address to the desired meter address. (Block 1210). Once updated, the meter 114 indicates the update is complete (e.g., illuminates a light, emits a sound, etc.). (Block 1212). The instructions 1200 then return to block 1202.

Alternatively, in the event the meter 114 determines the macro ID does not indicate to reprogram the meter 114 address (e.g., the control of block 1206 returns a result of NO), the meter then determines whether the macro ID indicates to enter guest information. (Block 1214). For example, the meter 114 may determine the macro ID indicates to enter guest information in the event the macro ID is an ID included in Table 1, above. In the event the meter 114 determines the macro ID does not indicate to enter guest information (e.g., the control of block 1214 returns a result of NO), control returns to block 1202.

Alternatively, in the event the meter 114 determines the macro ID does indicate to enter guest information (e.g., the control of block 1214 returns a result of YES), the meter identifies the age value. (Block 1216). The meter 114 further identifies the gender value. (Block 1218). Additionally, the meter 114 may store the age and gender values. (Block 1220). Once stored, the meter 114 indicates the guest information is entered (e.g., illuminates a light, emits a sound, etc.). (Block 1222). In response, control returns to block 1202.

Figure 13:
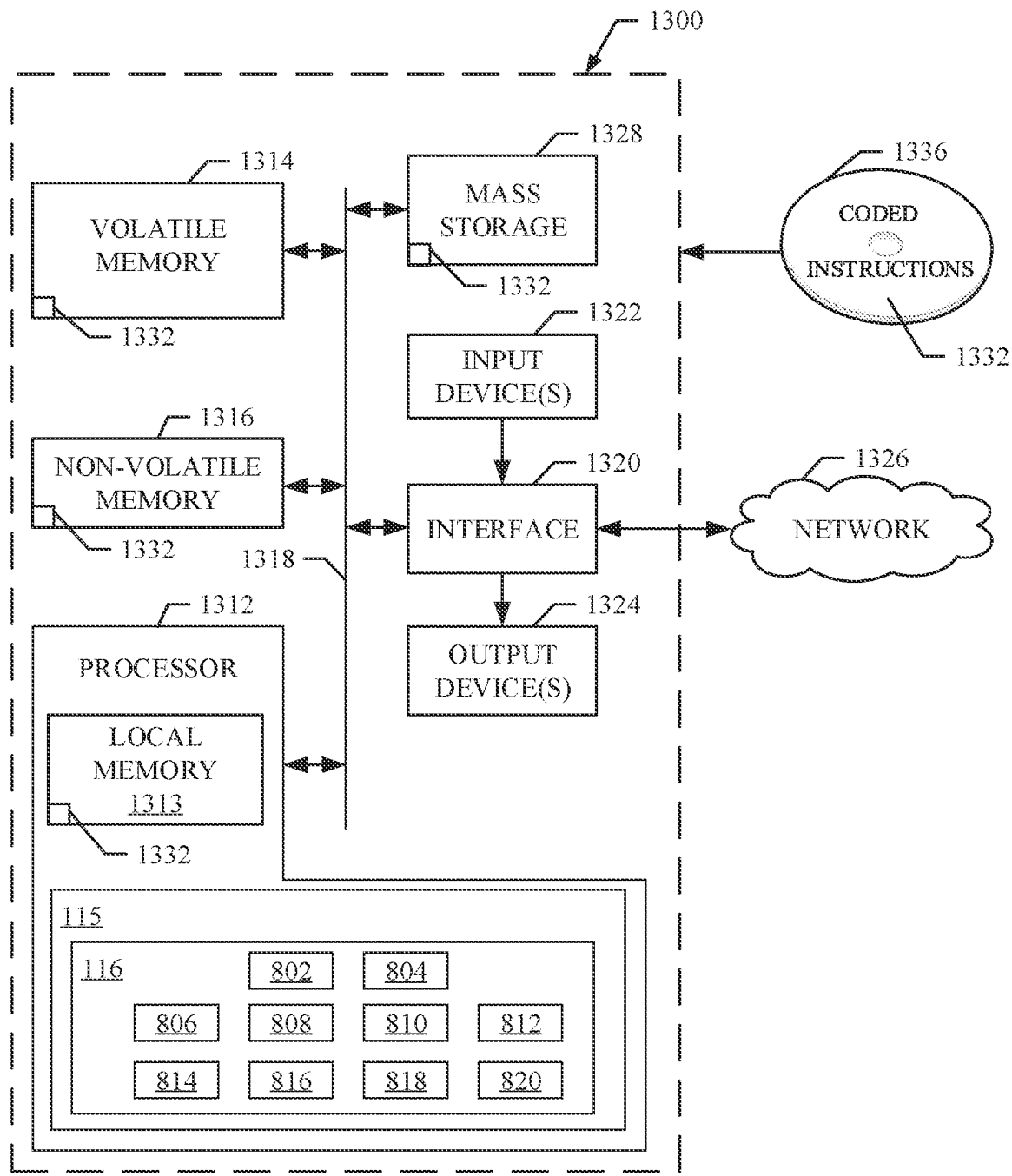
FIG. 13 is a block diagram of an example processor platform structured to execute the instructions of FIGS. 9, 10, and/or 11 to implement the audience management controller of the remote control device of FIGS. 1, 4A, 4B, 5A, 5B, 6, 7, and/or 8.

FIG. 13 is a block diagram of an example processor platform 1300 structured to execute the instructions of FIGS. 9, 10, and/or 11 to implement the audience management controller 116 of the remote control device 115 of FIGS. 1, 4A, 4B, 5A, 5B, 6, 7, and/or 8. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user display 802, the example operation mode manager 804, the example numerical input manager 806, the example display processor 808, the example confirmation manager 810, the example threshold analyzer 812, the example gender input manager 814, the example output processor 816, the example first database 818, the example second database 820, and/or, more generally, the example audience management controller 116 of the remote control device 115 of FIGS. 4A, 4B, 5A, 5B, 6, 7, and/or 8.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 9, 10, and/or 11 may be stored in the mass storage device 1328, in the volatile memory 1314, in the non-volatile memory 1316, and/or on a removable non-transitory computer readable storage medium such as a CD or DVD.

Figure 14:
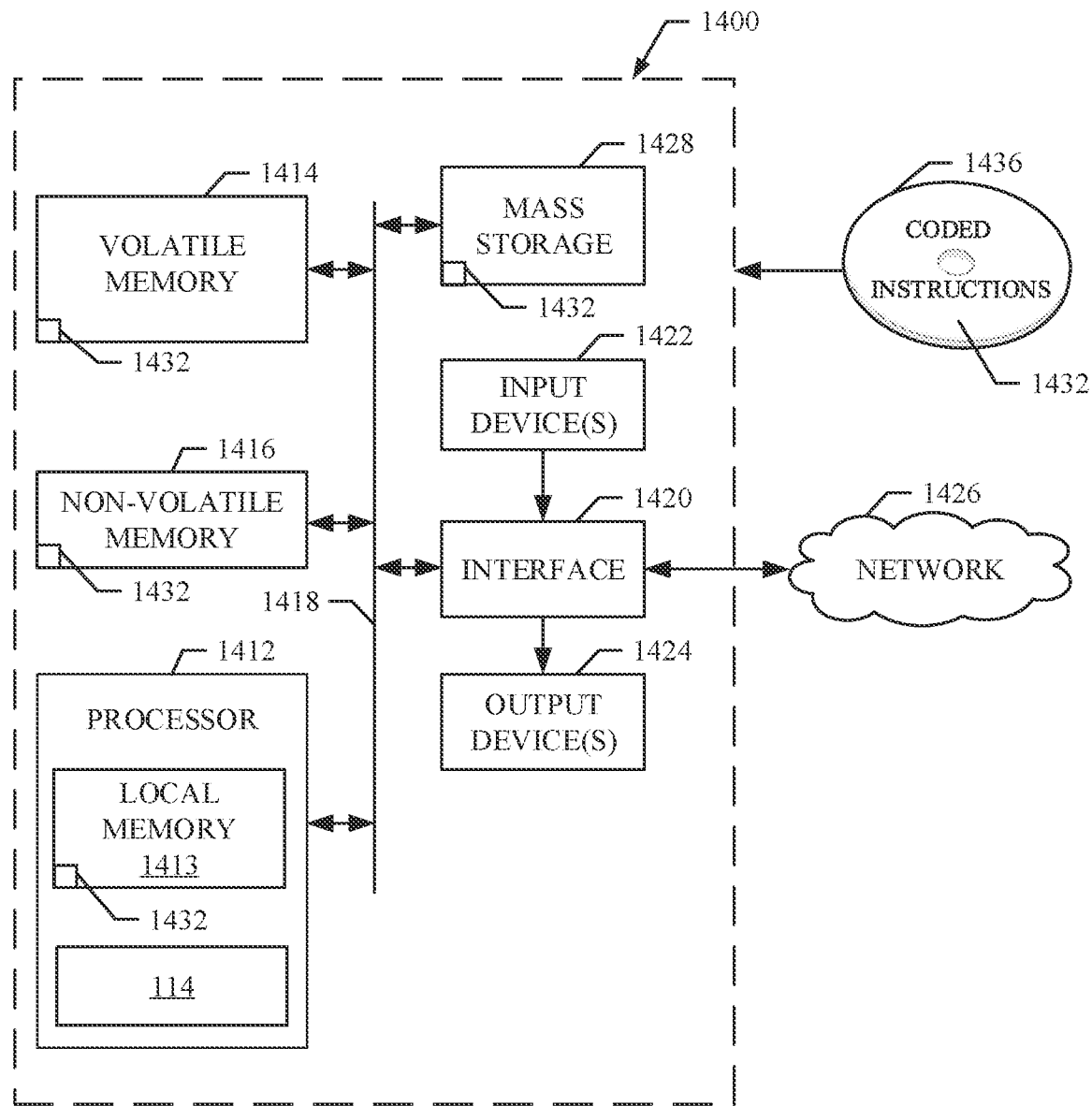
FIG. 14 is a block diagram of an example processor platform structured to execute the instructions of FIG. 12 to implement the meter of FIGS. 1, 2, and/or 3.

FIG. 14 is a block diagram of an example processor platform 1400 structured to execute the instructions of FIG. 12 to implement the meter 114 of FIGS. 1, 2, and/or 3. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example meter 114 of FIGS. 1, 2, and/or 3.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 12 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that implement remote control devices to interface with audience measurement meters. The disclosed methods, apparatus and articles of manufacture improve the efficiency of using a computing device by enabling a visitor to log demographic information (e.g., age, gender, etc.) to an audience measurement meter. Examples disclosed herein utilize a macro message to transmit such demographic information to an audience measurement meter. In examples disclosed herein, a macro message may be transmitted by sending a series of IR codes corresponding to the audience member demographic information to the audience measurement meter. In this manner, the IR codes sent from the remote control device identifies the audience member(s) currently in the viewing audience. The disclosed methods, apparatus and articles of manufacture are accordingly directed to one or more improvement(s) in the functioning of a computer.

Example methods, apparatus, systems, and articles of manufacture to implemented remote control devices to interface with audience measurement meters are disclosed herein. Further examples and combinations thereof include the following:

Example 1 includes a remote control device to interface with an audience measurement meter, the remote control device comprising an audience management controller to responsive to a gender value input via a user interface of the remote control device, store the gender value, responsive to an age value input via the user interface of the remote control device, store the age value, and generate a message including the gender value and age value, and a transmitter to transmit the message to the audience measurement meter, the message including a sequence of infrared codes.

Example 2 includes the remote control device of example 1, where the sequence of infrared codes includes a first infrared code corresponding to the gender value and a second infrared code corresponding to the age value.

Example 3 includes the remote control device of example 1, wherein the audience management controller includes a threshold analyzer to determine whether the age value satisfies a threshold.

Example 4 includes the remote control device of example 3, further including a display, wherein the audience management controller is to illuminate an error indicator on the display when the age value does not satisfy the threshold.

Example 5 includes the remote control device of example 1, wherein the audience management controller is to generate a second message responsive to a request to reprogram an address of the audience measurement meter, the second message including a first infrared code corresponding to a reprogram request and a second infrared code corresponding to an address input via the user interface of the remote control device.

Example 6 includes the remote control device of example 1, further including the user interface, the user interface including a numeric keypad to obtain the age value.

Example 7 includes the remote control device of example 1, further including the user interface, the user interface including a viewer entry section to obtain the gender value.

Example 8 includes a non-transitory computer readable storage medium comprising instructions which, when executed, cause at least one processor to at least responsive to a gender value input via a user interface of a remote control device, store the gender value, responsive to an age value input via the user interface of the remote control device, store the age value, generate a message including the gender value and age value, and transmit the message to an audience measurement meter, the message including a sequence of infrared codes.

Example 9 includes the computer readable storage medium of example 8, where the sequence of infrared codes includes a first infrared code corresponding to the gender value and a second infrared code corresponding to the age value.

Example 10 includes the computer readable storage medium of example 8, wherein the instructions, when executed, further cause the at least one processor to determine whether the age value satisfies a threshold.

Example 11 includes the computer readable storage medium of example 10, wherein the instructions, when executed, further cause the at least one processor to illuminate an error indicator on a display when the age value does not satisfy the threshold.

Example 12 includes the computer readable storage medium of example 8, wherein the instructions, when executed, further cause the at least one processor to generate a second message responsive to a request to reprogram an address of the audience measurement meter, the second message including a first infrared code corresponding to a reprogram request and a second infrared code corresponding to an address input via the user interface of the remote control device.

Example 13 includes the computer readable storage medium of example 8, wherein the instructions, when executed, further cause the at least one processor to obtain the age value via a numeric keypad.

Example 14 includes the computer readable storage medium of example 8, wherein the instructions, when executed, further cause the at least one processor to obtain the gender value via a viewer entry section.

Example 15 includes a method comprising responsive to a gender value input via a user interface of a remote control device, storing the gender value, responsive to an age value input via the user interface of the remote control device, storing the age value, generating a message including the gender value and age value, and transmitting the message to an audience measurement meter, the message including a sequence of infrared codes.

Example 16 includes the method of example 15, where the sequence of infrared codes includes a first infrared code corresponding to the gender value and a second infrared code corresponding to the age value.

Example 17 includes the method of example 15, further including determining whether the age value satisfies a threshold.

Example 18 includes the method of example 17, further including illuminating an error indicator on a display when the age value does not satisfy the threshold.

Example 19 includes the method of example 15, further including generating a second message responsive to a request to reprogram an address of the audience measurement meter, the second message including a first infrared code corresponding to a reprogram request and a second infrared code corresponding to an address input via the user interface of the remote control device.

Example 20 includes the method of example 15, further including obtaining the age value via a numeric keypad, and obtaining the gender value via a viewer entry section.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to interface with an audience measurement meter comprising:
   at least one memory;
   computer readable instructions; and
   a processor to execute the computer readable instructions to:
   obtain responsive to a gender value input via a user interface of the apparatus, store the gender value in the at least one memory of the apparatus;
   responsive to an age value input via the user interface of the apparatus, store the age value in the at least one memory of the apparatus; and generate a macro message including data entries and a macro identifier, the macro identifier based on a number of the data entries, the data entries including the gender value and the age value; and cause transmission of the macro message as a sequence of infrared codes to the audience measurement meter.

2. The apparatus of claim 1, where the sequence of infrared codes includes a first infrared code corresponding to the gender value and a second infrared code corresponding to the age value.

3. The apparatus of claim 1, wherein the processor is to determine whether the age value satisfies a threshold.

4. The apparatus of claim 3, wherein the processor is to cause an error indicator to be displayed on a display of the apparatus when the age value does not satisfy the threshold.

5. The apparatus of claim 1, wherein processor is to generate a second message responsive to a request to reprogram an address of the audience measurement meter, the second message including a first infrared code corresponding to a reprogram request and a second infrared code corresponding to an address input via the user interface of the apparatus.

6. The apparatus of claim 1, further including the user interface, the user interface including a numeric keypad to input the age value.

7. The apparatus of claim 1, further including the user interface, the user interface including a viewer entry section to input the gender value.

8. A remote control device comprising:
a user interface;
at least one memory;
computer readable instructions; and
a processor to execute the computer readable instructions to:
responsive to a gender value input via the user interface, store the gender value in the at least one memory;
responsive to an age value input via the user interface, store the age value in the at least one memory; and
generate a macro message including data entries and a macro identifier, the macro identifier based on a number of the data entries, the data entries including the gender value and the age value; and
cause transmission of the macro message as a sequence of infrared codes from the remote control device.

9. The remote control device of claim 8, wherein the sequence of infrared codes includes a first infrared code corresponding to the gender value and a second infrared code corresponding to the age value.

10. The remote control device of claim 8, wherein the processor determines whether the age value satisfies a threshold.

11. The remote control device of claim 10, further including a display for displaying an error indicator when the age value does not satisfy the threshold.

12. The remote control device of claim 8, wherein the macro message is a first macro message, and the processor is further to generate a second macro message responsive to a request to reprogram an address of the audience measurement meter, the second macro message including a first infrared code corresponding to a reprogram request and a second infrared code corresponding to an address input via the user interface of the apparatus.

13. The remote control device of claim 8, wherein the user interface includes a numeric keypad to input the age value.

14. The remote control device of claim 8, wherein the user interface includes a viewer entry section to input the gender value.

15. A method to interface with an audience measurement meter, the method comprising:
responsive to a gender value input via a user interface, storing the gender value in at least one memory;
responsive to an age value input via the user interface of the apparatus, storing the age value in the at least one memory of the apparatus; and
generating a macro message including data entries and a macro identifier, the macro identifier based on a number of the data entries, the data entries including the gender value and the age value; and
causing transmission of the macro message as a sequence of infrared codes to the audience measurement meter.

16. The method of claim 15, wherein the sequence of infrared codes includes a first infrared code corresponding to the gender value and a second infrared code corresponding to the age value.

17. The method of claim 16, further including determining whether the age value satisfies a threshold.

18. The method of claim 17, further including causing an error indicator to be displayed on a display when the age value does not satisfy the threshold.

19. The method of claim 15, wherein the macro message is a first macro message, the method further including generating a second macro message responsive to a request to reprogram an address of the audience measurement meter, the second macro message including a first infrared code corresponding to a reprogram request and a second infrared code corresponding to an address input via the user interface of the apparatus.

20. The method of claim 15, further including obtaining at least one of an age value or a gender value via inputs to one or more keys of the user interface.

* * * * *